(12) United States Patent
Chandrasekaran et al.

(10) Patent No.: US 6,397,352 B1
(45) Date of Patent: May 28, 2002

(54) RELIABLE MESSAGE PROPAGATION IN A DISTRIBUTED COMPUTER SYSTEM

(75) Inventors: Sashikanth Chandrasekaran, Belmont; Ashok R. Saxena, San Jose, both of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/256,847

(22) Filed: Feb. 24, 1999

(51) Int. Cl.[7] ............................. G06F 13/00; H04B 10/24

(52) U.S. Cl. ........................................... 714/16; 709/201

(58) Field of Search ............................... 714/16, 18, 42; 709/201, 203, 206, 207, 219, 303; 340/825.5; 370/410, 395; 379/93.8; 710/240

(56) References Cited

U.S. PATENT DOCUMENTS 6,026,165 A * 2/2000 Marino et al.
6,091,734 A * 7/2000 Suzuki et al.
6,167,137 A * 12/2000 Marino et al.
6,275,852 B1 * 8/2001 Filepp et al.

* cited by examiner

Primary Examiner—Gopal C. Ray
(74) Attorney, Agent, or Firm—Hickman Palermo Truong & Becker LLP; Carl L. Brandt; Edward A. Becker

(57) ABSTRACT

According to an approach for propagating messages in a distributed computer system, message information is identified that needs to be sent to a destination site. After the message information is identified, the message information is assigned a propagation sequence number that identifies when the message information is sent to the destination site relative to other message information sent from the source site to the destination site. A message that is based on the message information is then transmitted to the destination site. The transmitted message includes the sequence number value and a source ID that identifies the source site as transmitting the message to the destination site. After the message is received at the destination site, the propagation sequence number that was assigned to the message information may be stored in nonvolatile memory at the destination site. In response to transmitting the message to the destination site, the source site may store in nonvolatile memory, propagation information that includes the sequence number, propagation state information and a unique ID that uniquely identifies the message information. After storing the propagation information in nonvolatile memory, the source site may also send a commit request to the destination site. The source site then waits for a commit acknowledge message to be received from the destination site. In response to receiving the commit acknowledge message, the source site updates the propagation state information to indicate that changes that were included in the message have been committed at the destination site.

33 Claims, 13 Drawing Sheets

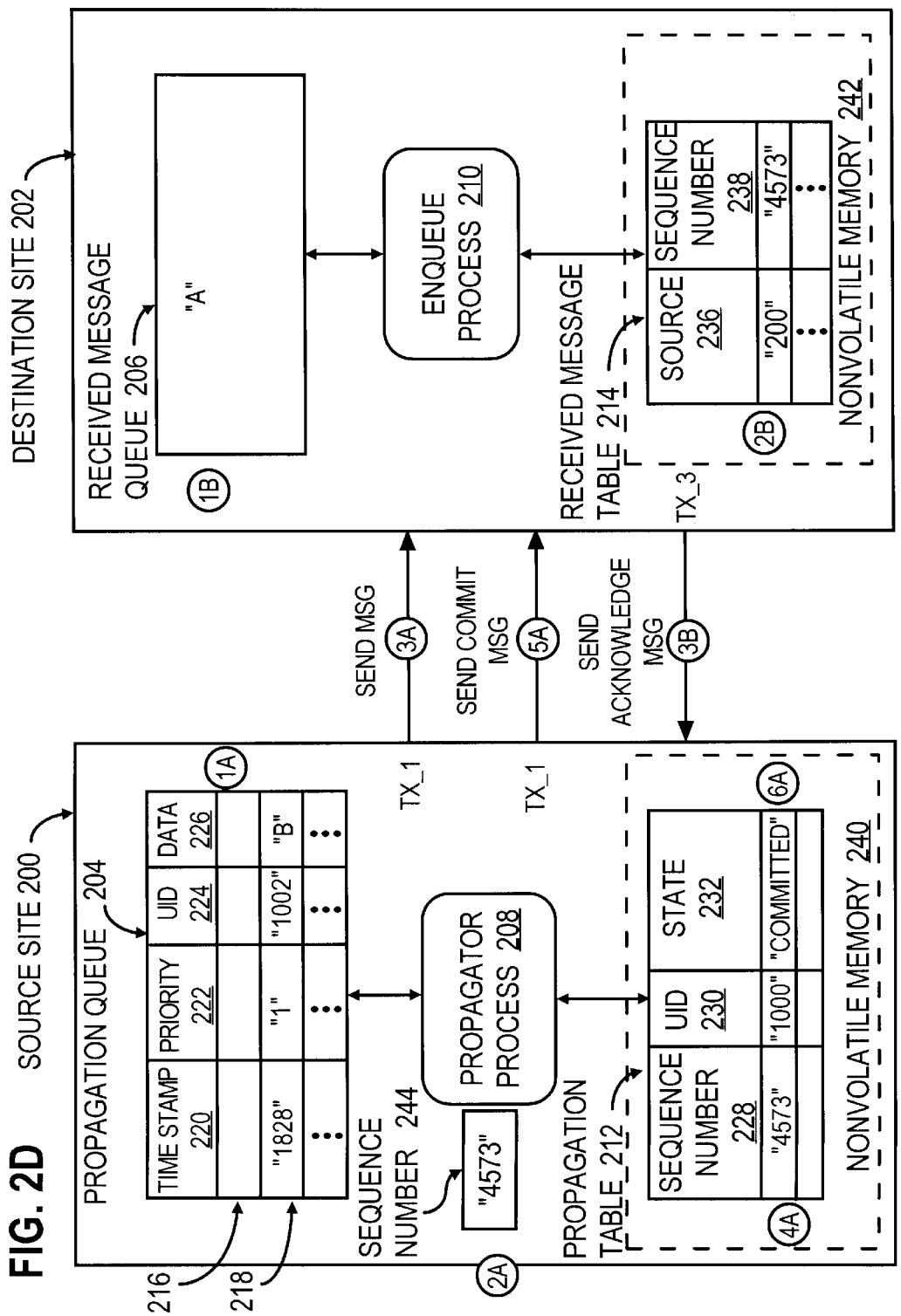

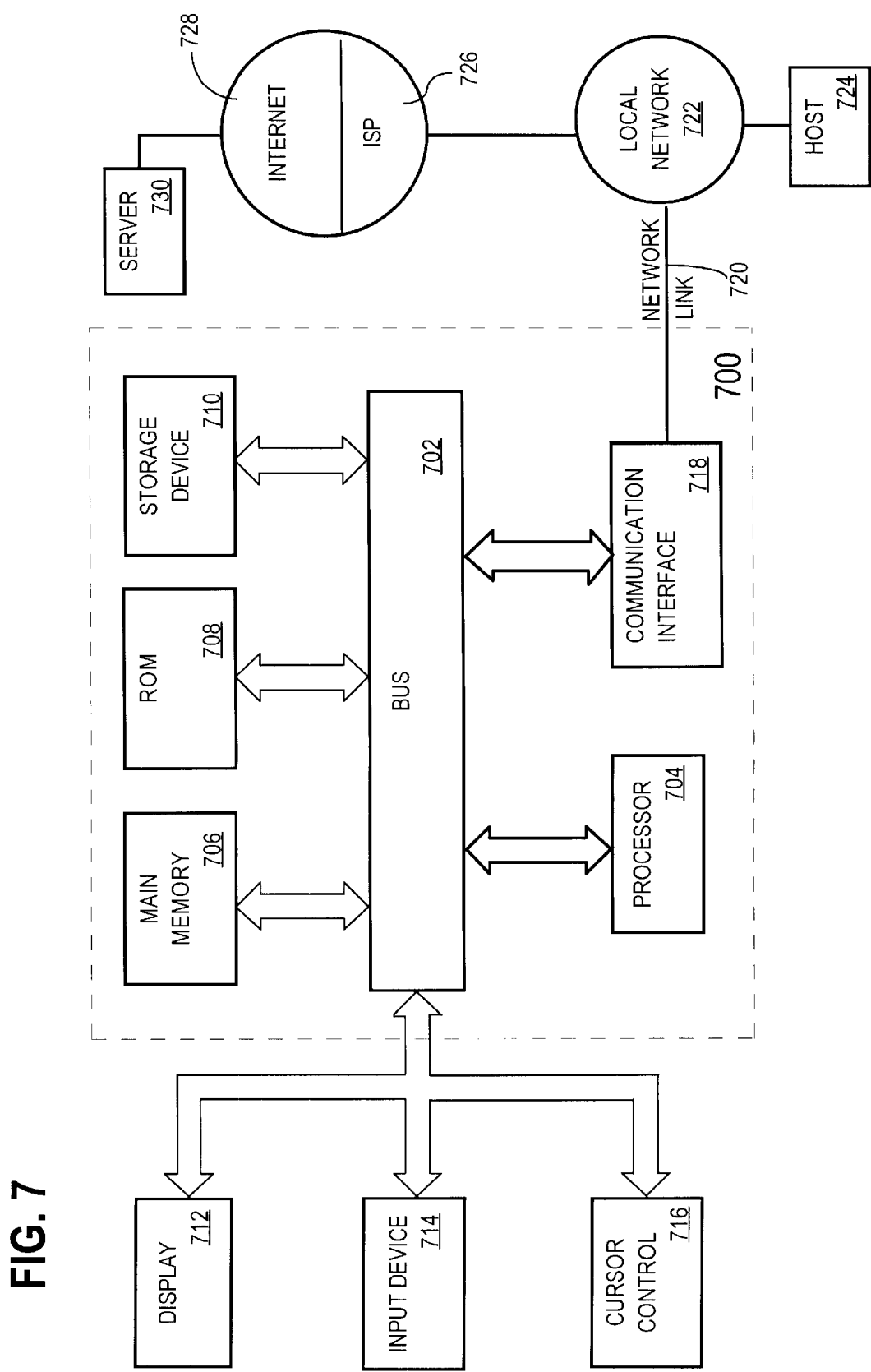

RELIABLE MESSAGE PROPAGATION IN A DISTRIBUTED COMPUTER SYSTEM

FIELD OF THE INVENTION

The present invention relates to distributed computer systems, and more specifically, to reliable message propagation in distributed computer systems.

BACKGROUND OF THE INVENTION

One of the long standing challenges in distributed computing has been the propagation of messages from one system to another. In many distributed computing systems, to maintain data consistency it is critical that each message be delivered exactly once to its intended destination site. For example, in a distributed database system, messages that are propagated to a destination site often specify updates that must be made to data that reside at the destination site. The updates are performed as a "transaction" at the destination site. Frequently, such transactions are part of larger distributed transactions that involve many sites. For the purpose of explanation, a message that specifies one or more operations that are to be performed as part of a transaction are referred to herein as "transaction messages".

If a transaction message is propagated multiple times to a particular destination site, the updates from the transaction may be incorrectly applied multiple times. For example, if a transaction message that debits an account "X" one-hundred dollars is sent twice to a destination site in which the account is maintained, the account "X" may be incorrectly debited two-hundred dollars instead of just one-hundred dollars.

In addition, to maintain data consistency, distributed database systems require that (1) all changes made by a distributed transaction must either be "committed" or, in the event of an error, "rolled back"; and (2) transaction messages are to be processed in the order in which they are received. When a transaction is committed, all of the changes to data specified by the transaction are made permanent. On the other hand, when a transaction is rolled back, all of the changes to data specified by the transaction already made are retracted or undone, as if the changes to the data were never made.

One approach for ensuring data consistency in a distributed computer system is by using a "two-phase commit" sequence to propagate messages between the distributed computer systems. According to the two-phase commit approach, a coordinating system (the source site) is responsible for coordinating the propagation of messages to the participating system (the destination site). For explanation purposes, the dequeue from the propagation queue is the transaction at the source site and the enqueue at the destination queue is the transaction at the destination site. However, in general, the operation at the destination site can be any arbitrary transaction.

The two-phase commit sequence involves two phases, the "prepare phase" and the "commit phase". In the prepare phase, the transaction is prepared at the destination site. When a transaction is prepared at a destination site, the database is put into such a state that it is guaranteed that modifications specified by the transaction to the database data can be committed. Once the destination site is prepared it is said to be in an "in-doubt" state. In this context, an in-doubt state is a state in which the destination site has obtained the necessary resources to commit the changes for a particular transaction but has not done so because a commit request has not been received from the source site. Thus, the destination site is in-doubt as to whether the changes for the particular transaction will go forward and be committed or instead, be required to be rolled back. After the destination site is prepared, the destination site sends a prepared message to the source site so that the commit phase may begin.

In the commit phase, the source site communicates with the destination site to coordinate either the committing or rollback of the transaction. Specifically, the source site either receives prepared messages from all of the participants in the distributed transaction, or determines that at least one of the participants has failed to prepare. The source site then sends a message to the destination site to indicate whether the modifications made at the destination site as part of the distributed transaction should be committed or rolled back. If the source site sends a commit message to the destination site, the destination site commits the changes specified by the transaction and returns a message to the source site to acknowledge the committing of the transaction. Alternatively, if the source site sends a rollback message to the destination site, the destination site rolls back all of the changes specified by the distributed transaction and returns a message to the source site to acknowledge the rolling back of the transaction. Thus, the two-phase commit sequence can be used to ensure that the messages are propagated exactly once and in order.

For example, FIG. 1 illustrates a conventional two-phase commit sequence for propagating messages from a source site 102 to a destination site 104. Source site 102 includes a server process 106 and a database 110. Server process 106 includes a transmit queue 114 that is used to store messages that need to be transmitted to destination site 104. In this example, transmit queue 114 currently contains a message ("TX_A") that needs to be enqueued at destination site 104. Similarly, destination site 104 includes a server process 108 and a database 112. Server process 108 includes a receive queue 116 that stores messages that are received from different sites.

In this example, a two-phase commit is performed to propagate TX_A from source site 102 to destination site 104. To perform the two-phase commit, at state "1", source site 102 begins a propagation transaction TX_1 to propagate a message that includes TX_A to destination site 104. Upon receiving a message, destination site 104 begins a transaction TX_2 to enqueue a message TX_A. In this example, it shall be assumed that the enqueue of TX_A will require that certain information be updated within data block 114 in database 112. At state "2", the source site 102 sends a "prepare" message to the destination site 104. After preparing the enqueue transaction, destination site 104 must retain the lock on some or all of the data that is contained in data block 114 until it receives a message from source site 102 to commit or abort the enqueue transaction.

Once destination site 104 is prepared, destination site 104 sends a prepared message (state 3) to source site 102 to indicate that it is prepared to commit transaction TX_2. The destination site 104 then waits in an in-doubt state for a message from the source site 102 that indicates whether the transaction TX_2 (enqueue of message TX_A) should be either committed or rolled back. Thus, the destination site 104 cannot release the locks acquired as part of the enqueue transaction until source site 102 responds with a message that indicates whether or not the enqueue of message TX_A is to be committed or rolled back. This may cause other transactions requiring access to data block 114 to be blocked while the enqueue transaction is in an in-doubt state. In certain cases, as when source site 102 fails, destination site 104 may be forced to remain in an in-doubt state for a significant amount of time. Thus, for some systems, such as banking database systems, the delays that can result from failures after a prepared phase in the two-phase commit protocol to propagate messages are unacceptable.

Upon receiving the prepared message, the source site 102 commits transaction TX_1 (the dequeue of message TX_A from the transaction queue). By committing propagation transaction TX_1, a record is stored in nonvolatile memory in database 110 that indicates that transaction TX_2 in destination site 104 must be committed.

At state "4", as part of propagation transaction TX_1, source site 102 sends a request message to the destination site 104 that indicates whether or not the enqueue of message TX_A should be committed or aborted. Upon receiving the request message, the destination site 104 either commits or aborts the enqueue of message TX_A. At state "5", the destination site 104 returns an acknowledge message to source site 102 to indicate that the request message was processed.

Upon receiving the acknowledge message, the source site 102 forgets (removes) the two-phase commit records related to transaction TX_1 and TX_2.

A significant drawback with using a two-phase commit sequence is that once the destination site 104 returns a prepared message to the source site 102 (state 2), until a request message is received from source site 102 (state 3), the destination site 104 must delay the processing of all subsequent messages that are received from other sites and need access to block 114. Since messages are to be enqueued in order, this is likely to occur. Thus, if a failure occurs at source site 102 after destination site 104 has prepared and is in the in-doubt state, destination site 104 will not be able to process any subsequent transaction messages that are received from other sites until source site 102 recovers. This delay seriously degrades the throughput of a distributed system as other sites may also be forced to wait for the source site to recover in order that their messages can be processed at the destination site.

For example, as previously indicated, once destination site 104 has prepared, destination site 104 waits in an in-doubt state until a message is received from source site 102 that indicates whether the changes for TX_A should be either committed or rolled back. However, if source site 102 fails prior to notifying the destination site 104 as to whether the changes for TX_A should be either committed or rolled back (between states 2 and 3), destination site 104 will remain in-doubt until source site 102 recovers. Thus, if the destination site 104 receives a transaction message from another site after source site 102 fails, the destination site 104 will be required to delay the processing of the subsequent message until source site 102 recovers.

One method to eliminate the use of the two-phase commit protocol while still guaranteeing that messages are delivered exactly once is to use a commit sequence number (SCN, or system commit number) to indicate which messages have been delivered to a destination site. A two-phase commit that uses commit sequence numbers for the delivery of messages is described in detail in U.S. Pat. No. 5,870,761, entitled "Parallel Queue Propagation", the contents of which is incorporated by reference in its entirety. In this scheme, each transaction that enqueues a message in transmit queue 114, stamps the message with a commit sequence number. Commit sequence numbers are monotonically increasing numbers. The propagator process dequeues all messages with a commit sequence number less than, say SCN_A and propagates them to the destination site. The destination site stores the highest commit sequence number obtained from a given source site in non-volatile memory as part of the same transaction that enqueues the message into receive queue 116. After a failure the source site queries the destination site for the latest commit sequence number that it received and resends all messages that have a higher commit sequence number from the transmit queue 114. This scheme requires that once a message has been enqueued into transmit queue 114 with a commit sequence number, say SCN_A no other messages will be enqueued into the transmit queue with a sequence number less than SCN_A. If this happens, the propagator process will not send these messages as the messages will not satisfy the criterion of all messages with commit sequence number greater than SCN_A. In most database systems it is impossible to generate a sequence number for the message atomically with the commit of the transaction. In other words, the sequence number that is stamped on the message is only "close" to the true commit sequence of the transaction itself. This is because the commit sequence can be exact only if the redo-log can be forced at the commit SCN and the index maintained on the commit SCN can be updated as an atomic change. One technique to achieve the atomicity is to obtain a lock before stamping the message with a commit sequence and releasing the lock after the commit. This guarantees that any other transaction that enqueues the message at the same time will need to wait for the lock and hence will acquire a higher commit sequence number. Clearly this scheme reduces system throughput as only one process can commit enqueues into the transmit queue at any one time. A solution to increase throughput is to let the transactions that commit the enqueue into the transmit acquire a shared lock and the propagator process that dequeues from the transmit queue acquire an exclusive lock before incrementing the commit sequence number. This will guarantee that once the propagator process has encountered a commit sequence number, any messages that are to be propagated in the future will have a higher commit sequence number. However, even this improved scheme has three drawbacks.

1) When the propagator process acquires the exclusive lock no other enqueue transactions that insert messages into the transmit queue can be committed (since they need to acquire a shared lock). This reduces system throughput.

2) The enqueue process that acquires a shared lock must update at least one block for each queue in which it inserted a message with the commit sequence number, commit the transaction and release the lock. Hence the duration of the commit steps is increased and the propagator cannot start transmitting messages during this time (since it needs an exclusive lock). This problem is especially bad for real-time propagation where each propagation batch has few messages and hence many transactions will be needed to propagate the messages (as opposed to batch propagation where fewer transactions will be needed and hence fewer attempts to get the lock in exclusive mode are needed).

3) The scheme cannot support propagation in a priority order since it requires that all messages with sequence number less than the commit sequence number chosen when the exclusive lock was acquired must be propagated before any other messages with a higher commit sequence number (even though the message with a higher commit sequence number may have a higher priority).

Based on the foregoing, there is a clear need to provide a mechanism that can reduce the problems that are associated with a two-phase commit sequence. In particular, there is a clear need to reduce or remove the in-doubt problem that occurs when using a two-phase commit sequence to propagate messages between a source site and a destination site.

There is also a clear need to provide a mechanism that can guarantee that a particular transaction message that is to be sent from a source site to a destination site will be processed once and only once at the destination site.

There is also need for a mechanism for allowing messages to be propagated in order of priority.

SUMMARY OF THE INVENTION

The foregoing needs, and other needs and objects that will become apparent from the following description, are achieved in the present invention, which comprises, in one aspect, a method for propagating messages from a source site to a destination site, the method comprising the computer-implemented steps of identifying message information that needs to be sent to and processed at the destination site. After identifying the message information, the message information is assigned a propagation sequence number that identifies when the message information is sent to the destination site relative to other message information sent from the source site to the destination site. A message that is based on the message information is then transmitted to the destination site. The transmitted message includes the sequence number value and a source ID that identifies the source site as transmitting the message to the destination site. After the message is received at the destination site, the propagation sequence number that was assigned to the message information is stored in nonvolatile memory at the destination site.

According to another feature of the invention, in response to transmitting the message to the destination site, the source site stores in nonvolatile memory, propagation information that includes the sequence number, propagation state information and a unique ID which uniquely identifies the message information.

In yet another feature, after storing the propagation information in nonvolatile memory, the source site sends a commit request to the destination site. The source site then waits for a commit acknowledge message to be received from the destination site. In response to receiving the commit acknowledge message, the source site updates the propagation state information to indicate that changes that were included in the message have been committed at the destination site.

In still another feature, the message information is identified by identifying message information that has been inserted into a propagation queue. The message information is dequeued from the propagation queue prior to assigning the propagation sequence number to the message information.

In still another feature, after the message is received at the destination site the message is enqueued for processing. The destination site then waits for a commit request message to be received from the source site. In response to receiving the commit request message, the changes associated with the message are committed at the destination site and a commit acknowledge message is sent to the source site.

The invention also encompasses a computer-readable medium, a computer system, and a computer data signal embodied in a carrier wave, configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2D further illustrates the reliable propagation mechanism shown in FIG. 2A;

FIG. 7 is a block diagram of a computer system hardware arrangement that can be used to implement aspects of the invention.

DETAILED DESCRIPTION OF THE PREFERRED EMBODIMENT

Figure 1:
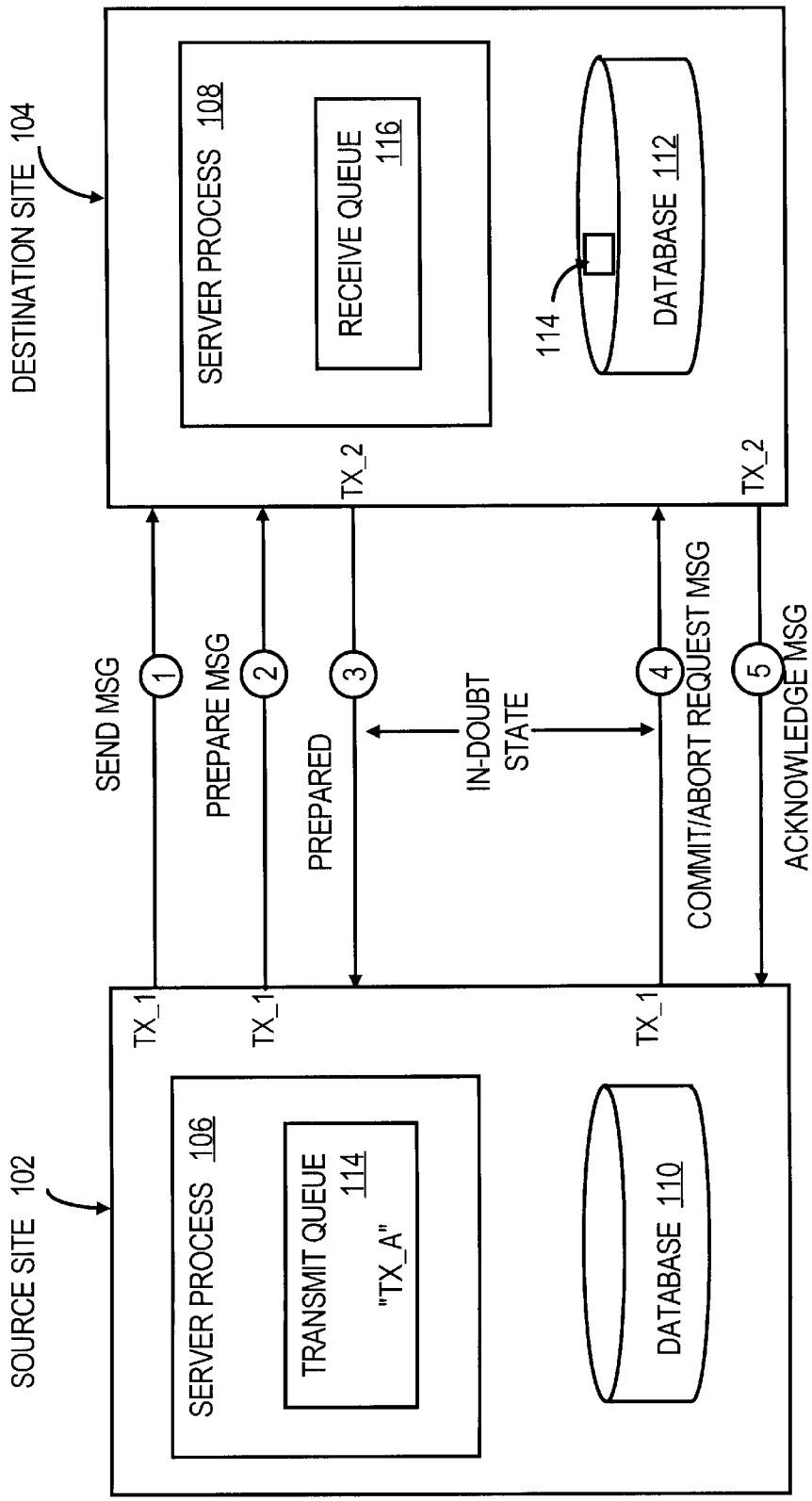
FIG. 1 illustrates a conventional two-phase commit sequence for propagating messages from a source site to a destination site.

A method and apparatus for reliable message propagation in a distributed computer system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For explanation purposes only, examples may be provided in the context of a distributed database system. However, embodiments of the invention are not limited to any particular type of distributed computer system. Instead, embodiments of the invention may be practiced on any transactional based distributed computer system. Examples of transactional based distributed computer systems may include such systems as queuing systems, file server systems and database server systems.

OVERVIEW

A reliable message propagation mechanism is provided for propagating messages from a source site to a destination site. In one embodiment, message data is inserted into a propagation queue that resides at a source site. In certain embodiments, the message data represents a transaction that is to be performed at the destination site. In inserting the message data into the propagation queue, a time stamp is generated for the message data and stored in the propagation queue. The timestamp identifies an ordering, relative to the insertion of other message data in the queue, as to when the message data was inserted into the propagation queue. In addition to the timestamp, a unique identifier (UID) is stored within the propagation queue for the message data. The unique identifier uniquely identifies the message data from other message data that is to be propagated from the source site to the destination site. In one embodiment, the timestamp and the unique identifier represent header information that is attached to the message data. In this context, the term "message" is used to represent the combination of the message data and its associated header information.

After a message is written into the propagation queue it may be dequeued and propagated to the destination site. In one embodiment, a propagation process identifies the messages that are to be propagated to the destination site. Once a message is identified, the propagation process dequeues the message from the propagation queue. The propagation process then assigns the message a propagation sequence number. The propagation sequence number indicates the order, relative to other propagated messages, in which a particular message is propagated from the source site to the destination site. According to one embodiment, the propagation sequence number is generated by incrementing a monotonically increasing counter.

Once the propagation sequence number is assigned to a message, the propagation process transmits the message along with the propagation sequence number to the destination site. The propagation process then stores the propagation sequence number, the UID and an initial propagation state ("propagated message data") into a propagation table that is maintained in durable (nonvolatile) memory at the source site. By maintaining the propagated message data in nonvolatile memory, a recovery mechanism is provided that allows the source site to determine, even after a source site failure, whether a particular message has previously been propagated to the destination site.

Upon receiving the message from the source site, the destination site enqueues the message for execution and stores the propagation sequence number and the identity of the source site ("received message data") in a received message table that is maintained in durable (nonvolatile) memory at the destination site. The information maintained in the received message table provides a mechanism that allows the destination site, even after a destination failure, to determine whether a particular message has previously been received from the source site. After enqueuing the received message, the destination site returns an acknowledgment to the source site to indicate that it has performed the enqueue.

In response to receiving the acknowledgment, the source site sends a commit message to the destination site to indicate the transaction should be comitted. In addition, the propagation process updates the message propagation state in the propagation table to indicate a commit message has been sent to the destination site for the particular message.

Figure 2A:
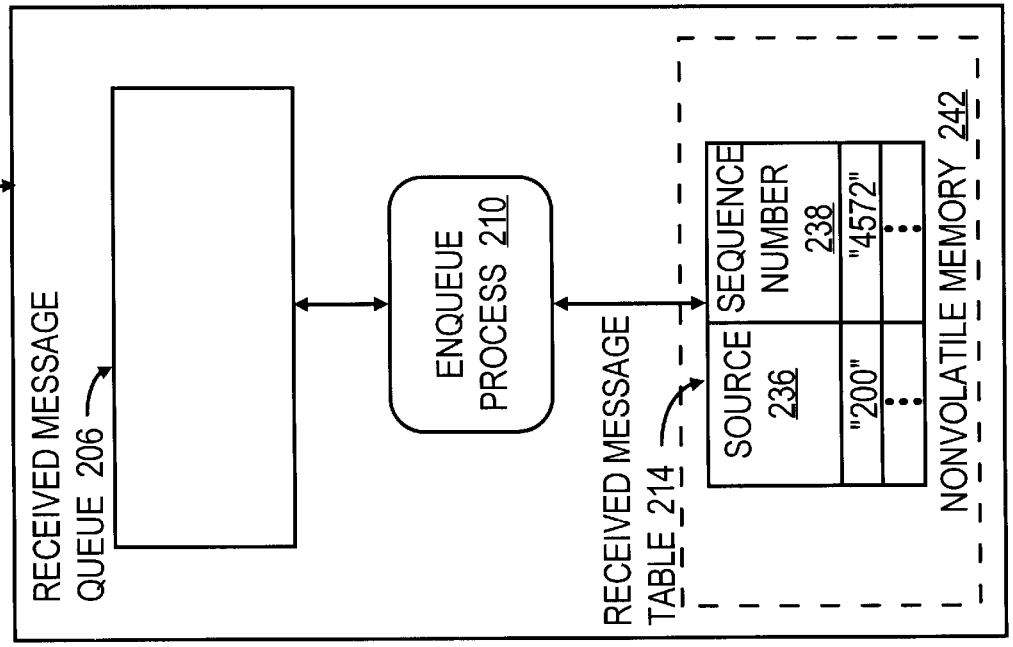
FIG. 2A illustrates a reliable propagation mechanism in which the present invention may be utilized.
Figure 2A:
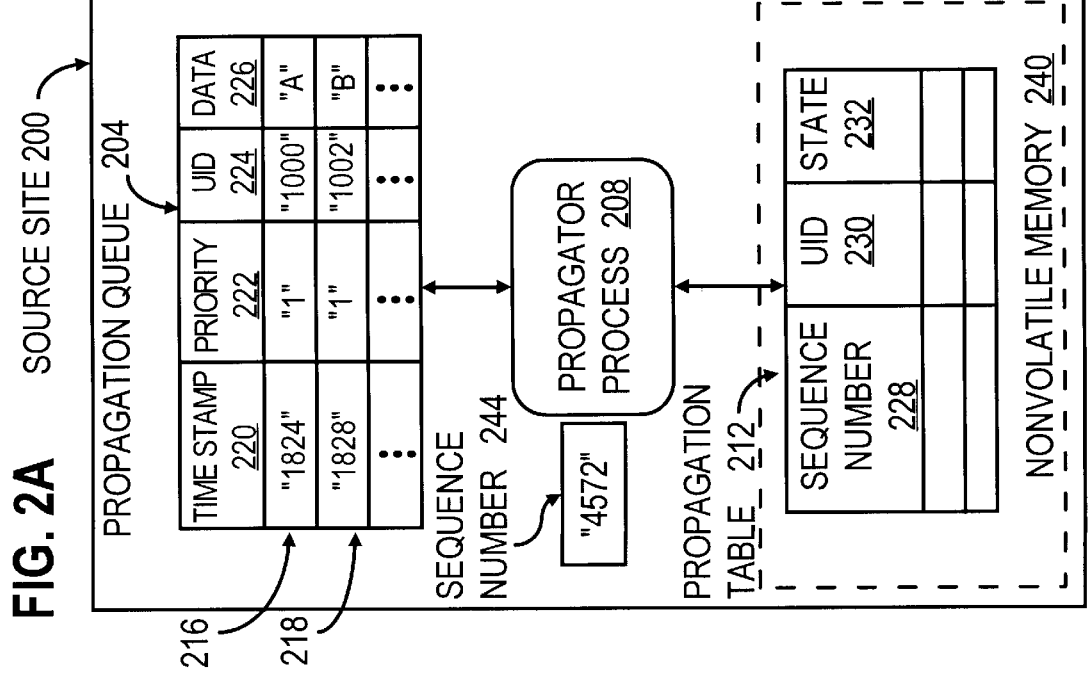

FIG. 2A illustrates a reliable propagation mechanism for propagating messages from a source site 200 to a destination site 202 according to certain embodiments of the invention. As illustrated, source site 200 includes a propagation queue 204, a propagator process 208, a propagation sequence number 244 and a propagation table 212. Propagation queue 204 maintains information about messages that need to be propagated to destination site 202. In one embodiment, a transaction is executed to store the message information into the propagation queue 204. In this context, the message information becomes visible within propagation queue 204 only after the transaction commits.

Message entries 216 and 218 depict two messages that are stored in propagation queue 204 at a particular snapshot in time. In this example, each message entry in propagation queue 204 includes a timestamp attribute 220, a priority attribute 222, a UID attribute 224 and message data 226. The timestamp attribute 220 indicates a relative time as to when a particular message was inserted into the propagation queue 204. For example, the time attribute value for message entry 216 indicates a relative insertion time of "1824". Conversely, the time attribute value for message entry 218 indicates a relative insertion time of "1826". Thus, in this example, message entry 216 was inserted into propagation queue 204 prior to the insertion of message entry 218.

Because the timestamp attribute is only required to indicate a relative time as to when the message information was inserted into the propagation queue, several different timing mechanisms may be used to generate the timestamp values. For example, the system change number (SCN) that was assigned as the commit time for the transaction that inserted the message information into the propagation queue can be used the timestamp value. Alternatively, the current wall clock time that existed at the time the message information was inserted into the propagation queue can be used as the timestamp value. Thus, embodiments of the invention are not limited to any particular method of generating timestamp values.

The priority attribute 222 provides a mechanism for determining a particular order in which messages are to be sent from the source site to the destination site. This allows messages that have a higher priority value, but a later timestamp value, to be propagated to the destination site first. For example, assume that a priority value of "1" is considered higher than a priority value of "2". If message entry 216 had contained a priority attribute value of "2" and not "1", message entry 218 would be selected for propagation prior to message entry 216 even though message entry 216 has a relative insertion time that is earlier than message entry 218.

The UID attribute 224 provides a mechanism for uniquely identifying each message that is stored in propagation queue 204. Thus, knowing the UID attribute values of messages that have been previously propagated from the source site to the destination site is tantamount to knowing which messages have previously been propagated from the source site to the destination site.

Message Data 226 holds the message data for each message that is written into the propagation queue 204. In one embodiment, the message data represents a transaction that needs to be performed at the destination site. In this example, message entries 216 and 218 respectively represent two messages (MESSAGE_A and MESSAGE_B) that have been written into propagation queue 204 but that have not yet been propagated to destination site 202.

Propagation sequence number 244 contains the current propagation sequence number. For explanation purposes only, the value of the propagation sequence number 244 has been set to "4572". When propagating a message to destination site 202, the propagation sequence counter 244 is incremented and the new value thereof is included with the message that is sent. As previously indicated, the propagation sequence numbers identify an ordering that indicates when a particular message is propagated from the source site to the destination site relative to other propagated messages.

Propagation table 212 is maintained in nonvolatile memory 240 at site 200. Propagation table 212 maintains a history of the messages that are sent from source site 200 to destination 202. By maintaining propagation table 212 in nonvolatile memory, propagated message information that is stored in propagation table 212 will not be lost upon the occurrence of a source site failure. In this example, propagation table 212 includes a sequence number attribute 228, a UID attribute 230 and a state attribute 232. When propagating a message to destination site 202, the propagator process 208 stores a propagation sequence number, a UID value and a state value for the particular message in propagation table 212. In one embodiment, the propagation state is initially set to a "prepared" state at the time the propagated message data is initially written into the propagation table 212. The prepared state indicates that the message has been previously propagated to the destination site but that a commit message has not yet been sent to the destination site 202 for the particular message.

The destination site 202 includes a received message queue 206, an enqueue process 210 and a received message table 214. The received message queue 206 is used to store message information that is received from another site. In one embodiment, messages are processed in the order in which they are stored in received message queue 206. When a message is received from another site, the enqueue process 210 enqueues the message into message queue 206 for processing at destination site 202.

The received message table 214, which is maintained in nonvolatile memory 242, stores message information ("received message data") that records which messages have been received, and the sites that sent them. In this example, received message table 214 includes a source attribute 236 and a sequence number attribute 238.

The source attribute 236 identifies the particular site from which the message was received. For example, a source attribute value of "200" may be used to indicate that a particular message was sent from source site 200. In certain embodiments, a received message table is used to store message information that is received from multiple source sites. In other embodiments, a separate received message table is used for messages from each source site. In one embodiment, when a separate received message table is used for messages from each source site, source attribute 236 is not included in received message table 214.

The sequence number attribute 238 stores the value of the propagation sequence number that has been assigned to the received message. Because the values of the sequence number attributes are monotonically increasing for each source site, they can be used to determine the last message that was received from a particular source site.

As depicted in FIG. 2A, the received message data in received message table 214 indicates that the last message received at destination site 202 from source site 200 had a propagation sequence number of "4572".

PROPAGATING A MESSAGE FROM A SOURCE SITE

Figure 2B:
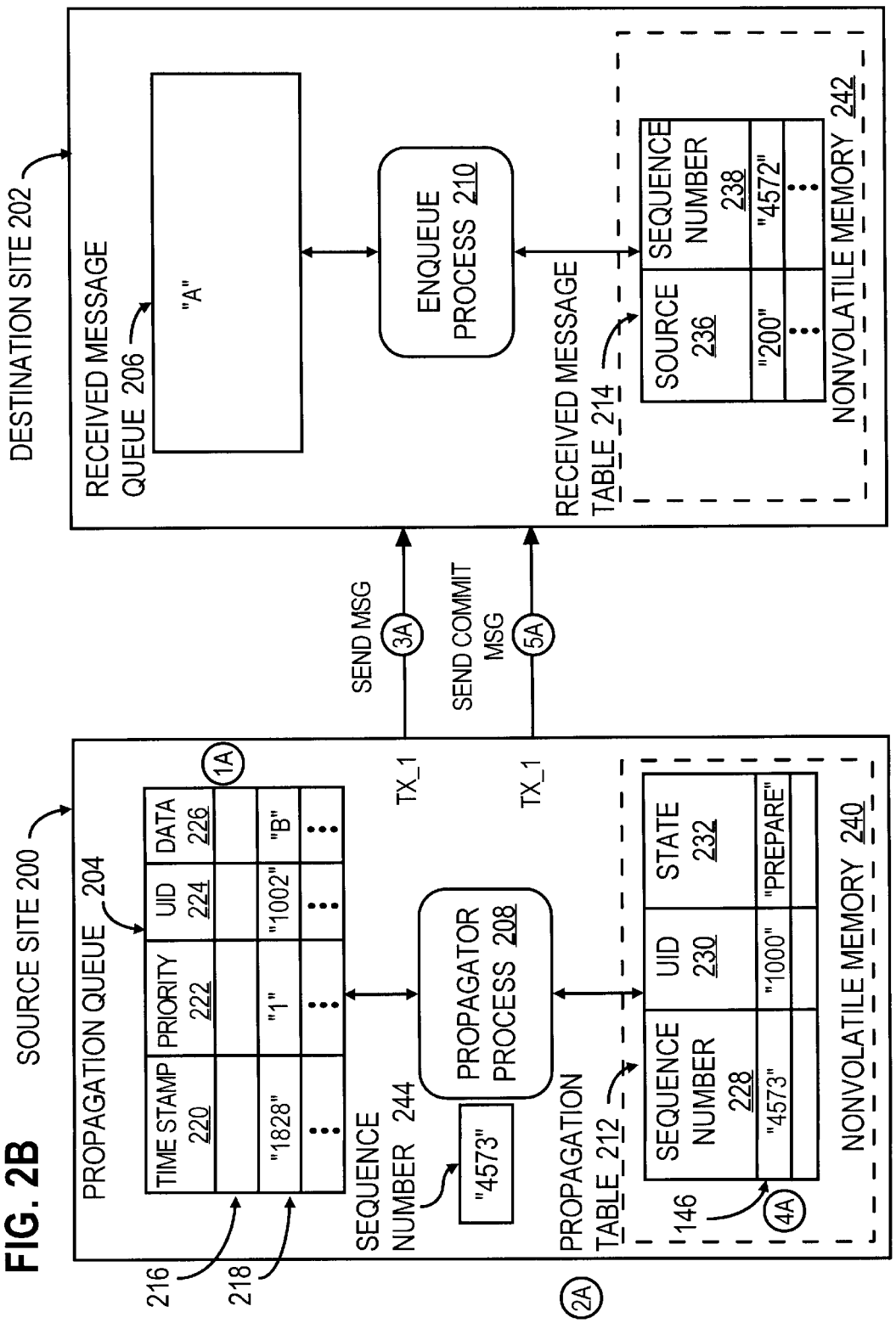
FIG. 2B further illustrates the reliable propagation mechanism shown in FIG. 2A.
Figure 2C:
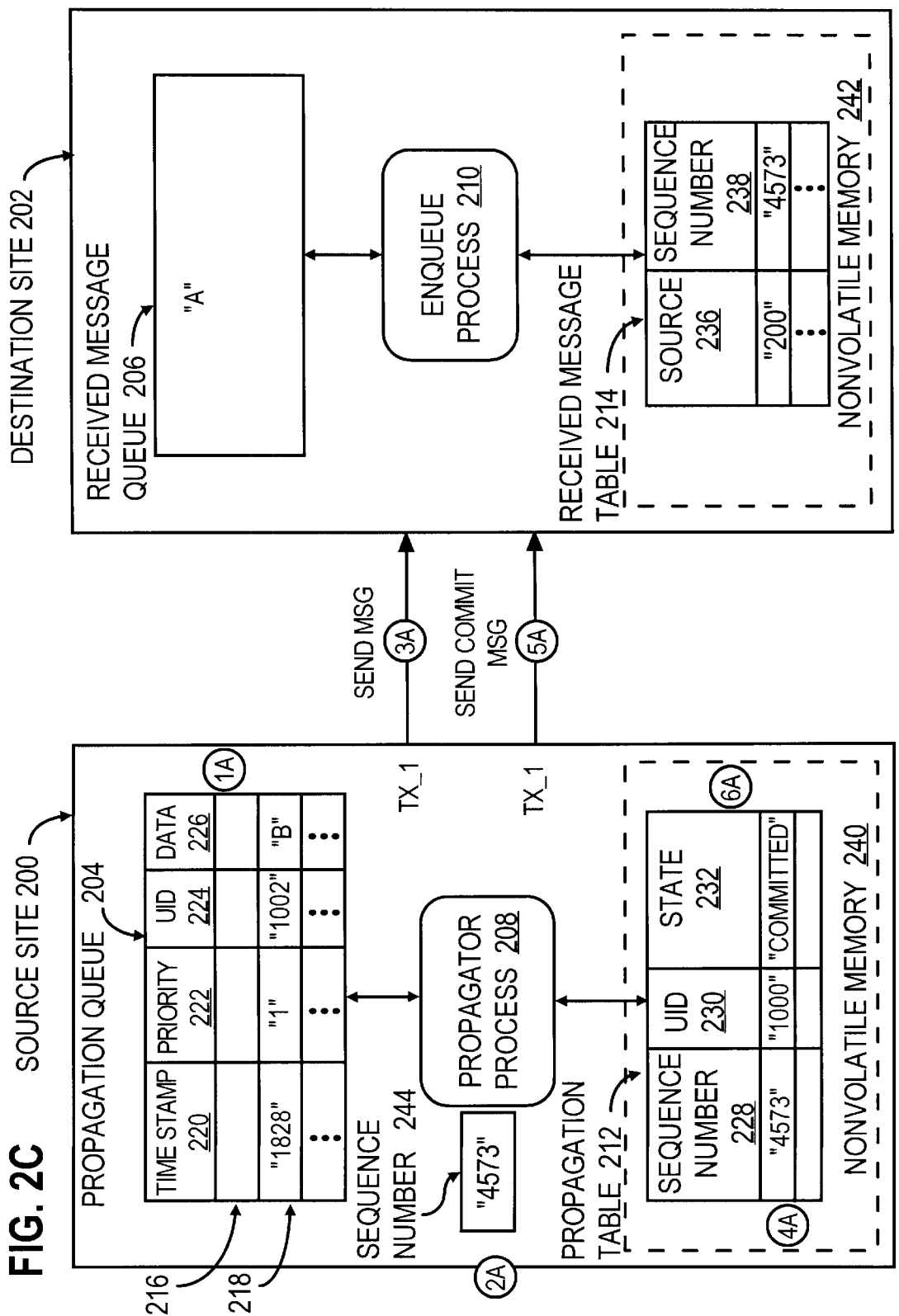
FIG. 2C further illustrates the reliable propagation mechanism shown in FIG. 2A.
Figure 3:
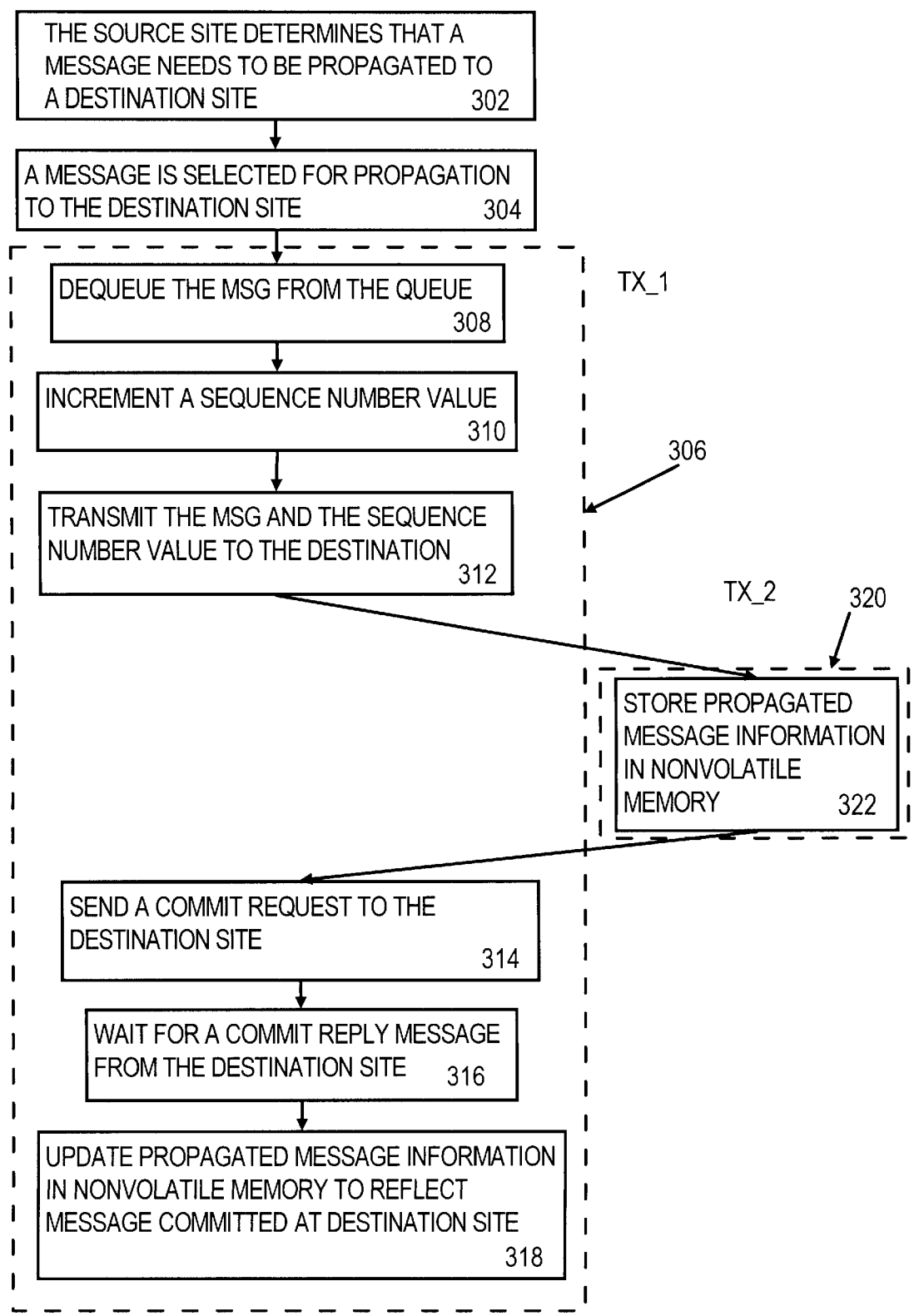
FIG. 3 is a flow diagram that illustrates steps involved for propagating a message from a source site in accordance with an embodiment of the invention.

FIG. 3 depicts a flow diagram that illustrates a mechanism for propagating a message from a source site in accordance with an embodiment of the invention. According to one embodiment of the invention, the steps are performed by one or more database servers which receive the message information from a database client. For explanation purposes, FIG. 3 is discussed with reference to the components of FIGS. 2A through 2C.

As shown in FIG. 3, at step 302 a source site determines that a message needs to be propagated to a destination site.

In one embodiment, a propagation process repeatedly polls a propagation queue to identify messages that need to be propagated to the destination site. In another embodiment, an interrupt signal is sent to a propagation process whenever a particular number of messages are inserted into the propagation queue. For example, referring to FIG. 2A, propagator process 208 may receive an interrupt signal each time a message is inserted into propagation queue 204. Alternatively, the propagator process 208 may receive an interrupt signal only after ten messages are inserted into propagation queue 204.

At step 304, a message is selected for propagation to the destination site. In certain embodiments, an index is used to order the messages that need to be propagated at any point in time. For example, a B-tree index that is based on the priority and time attribute values of each message may be used to order the messages that have been entered into propagation queue 204. In certain embodiments, preference is given to the priority attribute value when indexing the messages. For example, if MESSAGE_X has a timestamp value of "2030" and a priority value of "3" and MESSAGE_Y has a timestamp value of "2587" but a priority value of "1" (1 being a higher priority than 3), then MESSAGE_Y will be selected for propagation prior to MESSAGE_X even though MESSAGE_X has an earlier timestamp value.

In other embodiments, the messages are indexed using only a single attribute. For example, messages may be indexed based on only their priority attribute values. Alternatively, messages may be indexed based on only their time attribute values.

Using the index, the propagation process selects the message entry that contains the earliest time attribute value from all messages that are currently contained in the propagation queue. For example, because the time attribute values of message entries 216 and 218 indicate that MESSAGE_A was inserted prior to MESSAGE_B, and because message entries 216 and 218 both contain the same priority attribute values, propagation process 208 selects MESSAGE_A for propagation to destination site 202. Thus, for explanation purposes, it shall be assumed that the message for entry 216 is selected for propagation to destination site 202.

At block 306, a first transaction ("TX_1") is initiated at the source site for propagating the message to the destination site. As shown in FIG. 3, the functions performed by TX_1 are depicted in steps 308-318. By performing steps 308–318 as a single transaction (TX_1), the steps are executed as an atomic operation.

At step 308, the selected message is dequeued from propagation 204. For example, as depicted in state "1A" of FIG. 2B, propagator process 208 dequeues the message in propagation queue 204 for message entry 216.

At step 310, the propagation sequence number is incremented to generate a new propagation sequence number. For example, as depicted in state "2A", the value of propagation sequence number 244 is increased to "4573".

At step 312, the message, the assigned propagation sequence number and information that identifies source site as the propagating site, are sent to the destination site. For example, as indicated by state "3A", as part of TX_1, the message for entry 216 and the propagation sequence number value of "4573" is transmitted from source site 200 to destination site 202.

At block 320 a second transaction ("TX_2") is initiated at the source site for storing the propagated message information in nonvolatile memory. The second transaction is performed as a separate transaction to durably store the fact that the message has been sent to the destination site. Because TX_2 is performed as a separate transaction, once TX_2 commits its updates will not be rolled back (removed) even if TX_1 is required to be rolled back. As illustrated, the functions performed by TX_2 are depicted in step 322.

At step 322, using a separate transaction, the message sequence number, message UID and an initial state value are stored in nonvolatile memory as an atomic operation. For example, as depicted in state "4A", the current propagation sequence number "4573", the message UID value "1000" and an initial state "PREPARED" is stored in propagation table 212 within nonvolatile memory 204. The PREPARED state indicates that the message has been sent but that an acknowledge message has not yet been received for the message from the destination site. This information will allow the source site to determine whether a particular message has previously been sent to the destination site. Once the propagated message information is stored in non-volatile memory the second transaction (TX_2) is complete and therefore commits.

At step 314, a commit request is sent to the destination site to request the destination site to commit the changes specified in the message. For example, as indicated by state "5A", as part of TX_1, a commit message is transmitted from source site 200 to destination site 202.

At step 316, after sending the commit request, the source site waits for the destination to return a commit reply message that indicates the changes have been committed at the destination site.

At step 318, in response to receiving a commit reply message from the destination site, the propagation message information in nonvolatile memory is updated to reflect that the changes for the message have been committed at the destination site and first transaction then commits. For example, as depicted in state "6A" of FIG. 2C, in response to receiving a commit reply message from the destination site 104, the state attribute 232 for entry 146 is updated to indicate that the changes have been committed at destination site 102. Thereafter, TX_1 commits causing its changes to be durably recorded.

Because the state attribute 232 for a particular entry is only updated to the "committed" state after an acknowledge message is received, messages for entries in the propagation table having a "committed" state are guaranteed that they will not be required to be re-propagated to the destination site even after a source site failure.

RECEIVING A MESSAGE AT A DESTINATION SITE

Figure 4:
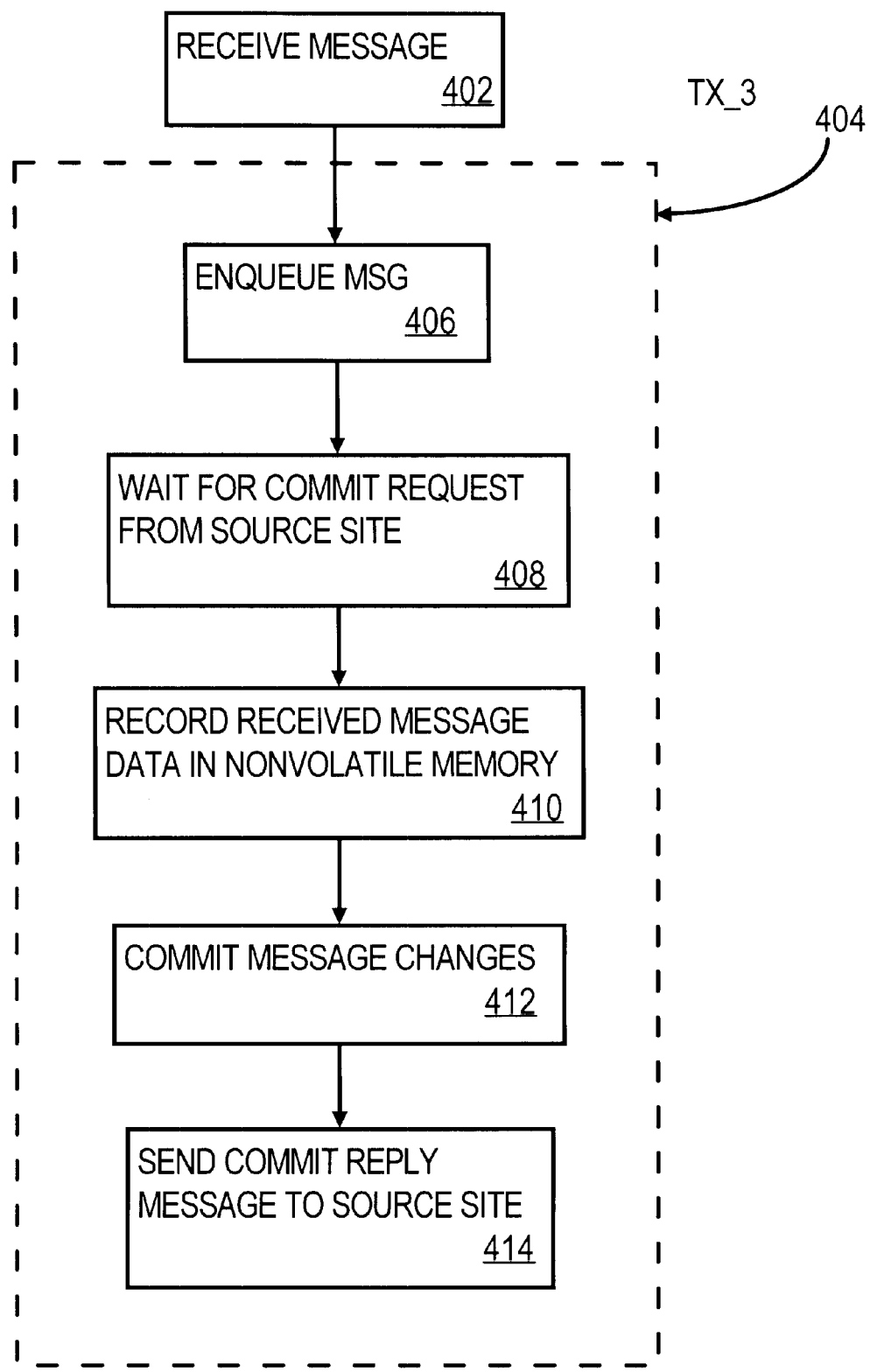
FIG. 4 is a flow diagram that illustrates steps involved for receiving a message at a destination site in accordance with an embodiment of the invention.

FIG. 4 depicts a flow diagram that illustrates a mechanism for receiving a message at a destination site in accordance with an embodiment of the invention. For explanation purposes, FIG. 4 is discussed with reference to the components of FIG. 2D.

As shown in FIG. 4, at step 402 a message is received at the destination site. For explanation purposes, it shall be assumed that the message for message entry 216 was sent to destination site 202 from source site 200. It shall also be assumed that the steps of FIG. 4 are performed in conjunction with the steps previously described in FIG. 3 and FIGS. 2A–2C.

At block 404, a third transaction ("TX_3") is initiated at the destination site for receiving the message at the destination site. As shown in FIG. 4, the functions performed by TX_3 are depicted in steps 406–414. By performing steps 406–414 as a single transaction (TX_3), the steps are executed as an atomic operation.

At step 406, the received message information is enqueued into a received message queue for processing. For example, as depicted in state "1B" in FIG. 2D, upon receiving the message and propagation sequence number for message entry 116, enqueue process 210 strips off any header information and the propagation sequence number ("4573") and enqueues the message information ("A") in received message queue 206.

At step 408, the destination site waits for a commit message to be received from the source site. However, if the destination site determines that the source site has failed or that the connection between the destination site and the source site has failed, the destination site may abort the third transaction TX_3. The aborting of TX_3 causes all changes for transaction TX_3 to be rolled back, thus releasing all resources that were previously being held or locked for the received message ("A"). Once the changes for transaction TX_3 have been rolled back, the destination site may continue to process messages that are received from other sites.

For example, if destination site 202 determines after receiving message "A" that source site 200 has failed, destination site 202 rolls back TX_3 thus causing message "A" to be dequeued from received message queue 206. By dequeuing message "A", destination site 202 may continue to execute as if it never received message "A" from source site 200, as it is guaranteed that message "A" will be retransmitted upon the recovery of source site 200.

At step 410, upon receiving a commit message from the source site, the received message data is stored into non-volatile memory at destination site 102. For example, upon receiving a commit message from source site 200 (state 5A), as illustrated by state "2B" in FIG. 2D, a source identifier information "200" and the propagation sequence number "4573" are stored in received message table 214 in non-volatile memory 242. This information can be used in the event of a failure to determine whether a particular message was previously received at destination site 202 from source site 200.

At step 412, upon receiving a commit message from the source site, the destination site commits the enqueue and the updates to the receive table.

At step 414, the destination site sends a commit reply message to the source site to indicate that the changes contained in the message have been committed at the destination site. For example, as illustrated by state "3B" in FIG. 2D, TX_3 is committed causing its changes to be durably recorded at destination site 202. Destination site 202 then sends a commit reply message to source site 200.

By performing the steps of 406–414 as a single atomic operation, the changes that are contained in a message that is received at the destination site are either committed or aborted. Thus, the in-doubt state that is normally present in a two-phase commit sequence is eliminated.

In certain embodiments, when the destination site detects that a communication link with the source site has failed, (either because the source site or the link itself has failed), the destination site may roll back any transaction that is currently being used to receive a message from the source site that has not yet committed.

For example, at step 410, if destination site 202 determines that source site 200 has failed, destination site 202 may cause TX_3 to be rolled back thus removing all updates that it previously made at destination site 202. Thereafter, destination site 202 will behave as if the message had never been received from the source site 200.

RECOVERING AFTER A FAILURE

As previously indicated, a source site failure may occur while a message is being propagated from a source site to a destination site. In one embodiment, during recovery, the source site queries the destination site to determine the last message that the destination site received from the source site. In one embodiment, the highest propagation sequence number that has been stored at the destination site for any message received from the source site is used to identify the last message that destination site received from the source site.

As previously indicated, messages whose entries in the propagation table have been updated to a "committed" state are guaranteed to have already been committed at the destination site. Thus, upon recovery, only those messages whose entry in the propagation table are in a "prepared" state are uncertain as to whether they have been committed at the destination site.

Figure 5:
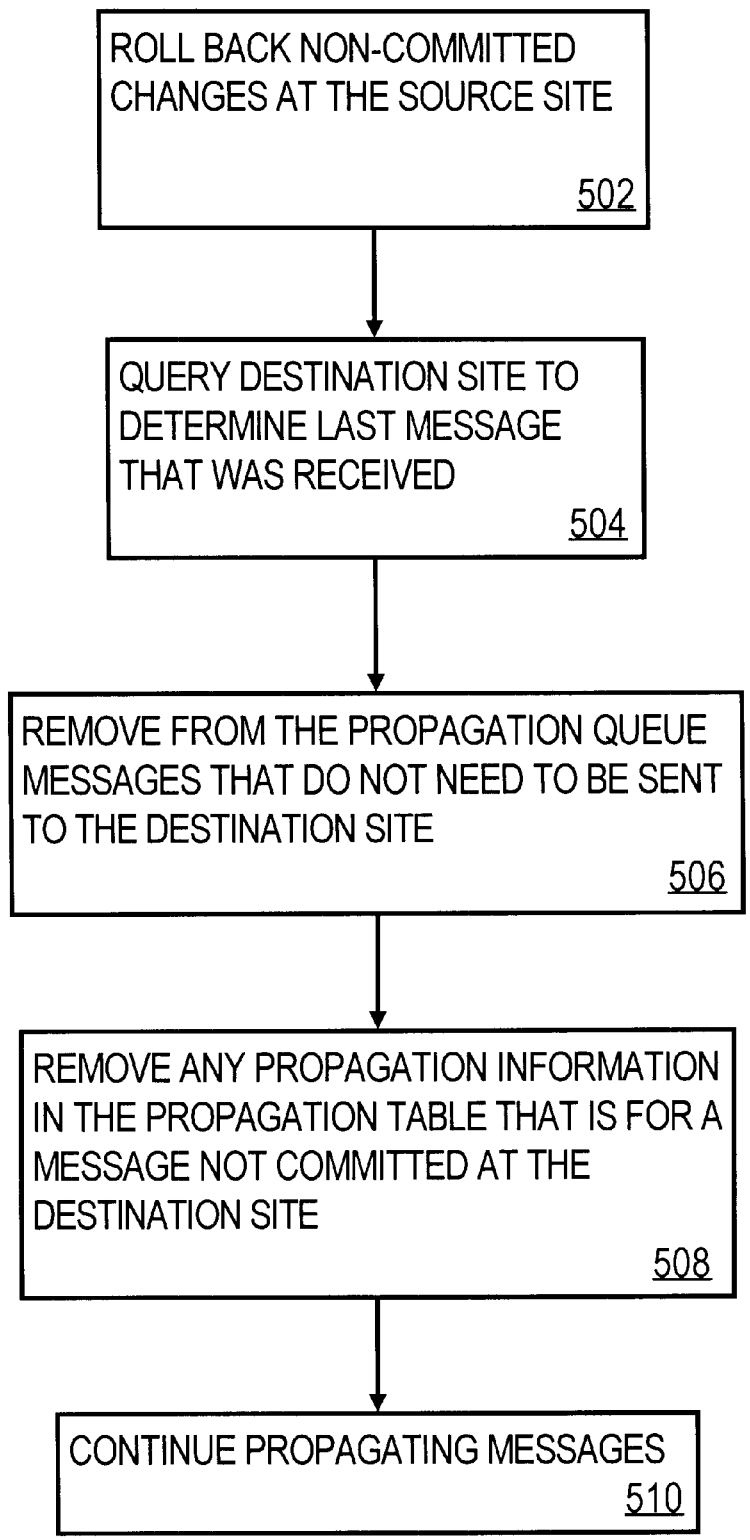
FIG. 5 depicts a flow diagram of a recovery sequence that can be used to determine whether a particular message still needs to be sent to the destination site.

FIG. 5 depicts a flow diagram of a recovery sequence that can be used to determine whether a particular message still needs to be sent to the destination site.

As illustrated, at step 502, the source site rolls back the changes for all transactions that had not committed as of the time of the failure. For example, referring to FIG. 3, if a failure occurs prior to TX_1 committing, the steps in block 306 are rolled back to remove changes made by TX_1 prior to the failure of source site 200.

At step 504, the source site communicates with the destination site to determine the last message that the destination site received from the source site. For example, after rolling back, source site 200 queries destination site 202 for the highest propagation sequence number that destination site 202 has received in a message from source site 200. In receiving the request, destination site 202 reads the received message information in received message table 214 to identify the propagation sequence number. For example, referring to FIG. 2D, the propagation sequence number "4573" is identified for source site 200.

At step 506, messages that no longer need to be propagated are removed from the propagation queue. In one embodiment, messages that need to be removed from the propagation queue are identified by locating entries in the propagation table that have a propagation sequence number that is less than the propagation sequence number that was returned from destination site. The source site then uses the UID value that is assigned to those entries to identify and remove any messages within the propagation queue that have corresponding UID values.

For example, referring to FIG. 2C, if source site 200 fails after destination site 202 has committed the changes for message "A" but prior to the committing of TX_1, in rolling back TX_1 then message "A" will be reinserted in propagation queue 204 (message entry 216) even though the message has already been sent and committed at destination site 202. To determine that message "A" as already being propagated, source site 200 identifies the message entries in propagation table 212 that have a propagation sequence number that is less than the propagation sequence number that was returned from destination site 202. Using the UID values of the message entries that are identified, source site 200 identifies and removes any messages within the propagation queue 204 that have a corresponding UID value.

At step 508, the source site removes all propagation information from nonvolatile memory that is associated with messages that have been assigned a propagation sequence number that is higher than the propagation sequence number that was returned by the destination site. For example, referring to FIG. 2B, if source site 200 had failed after storing the propagation information at state "4A", but before sending the commit message at state "5A", then destination site 202 would return a highest propagation sequence number "4572" when queried by source site 200. The sequence number "4572" is used only for illustrative purposes. The only requirement is that it be less than 4573. In other words, the sequence numbers although monotonically increasing need not be continuous. Thus, because entry 146 includes message information that has been assigned a higher propagation sequence number ("4573") than the propagation sequence number that was returned from destination site 202 ("4572"), the information for entry 146 is removed from propagation table 212.

At step 510, source site continues the propagation of messages to the destination site.

PROPAGATING MULTIPLE MESSAGES

Although the previous examples have depicted a single message being propagated from the source site to the destination site, in certain embodiments, multiple messages may be batched together and propagated as a single message from the source site to the destination site.

Figure 6A:
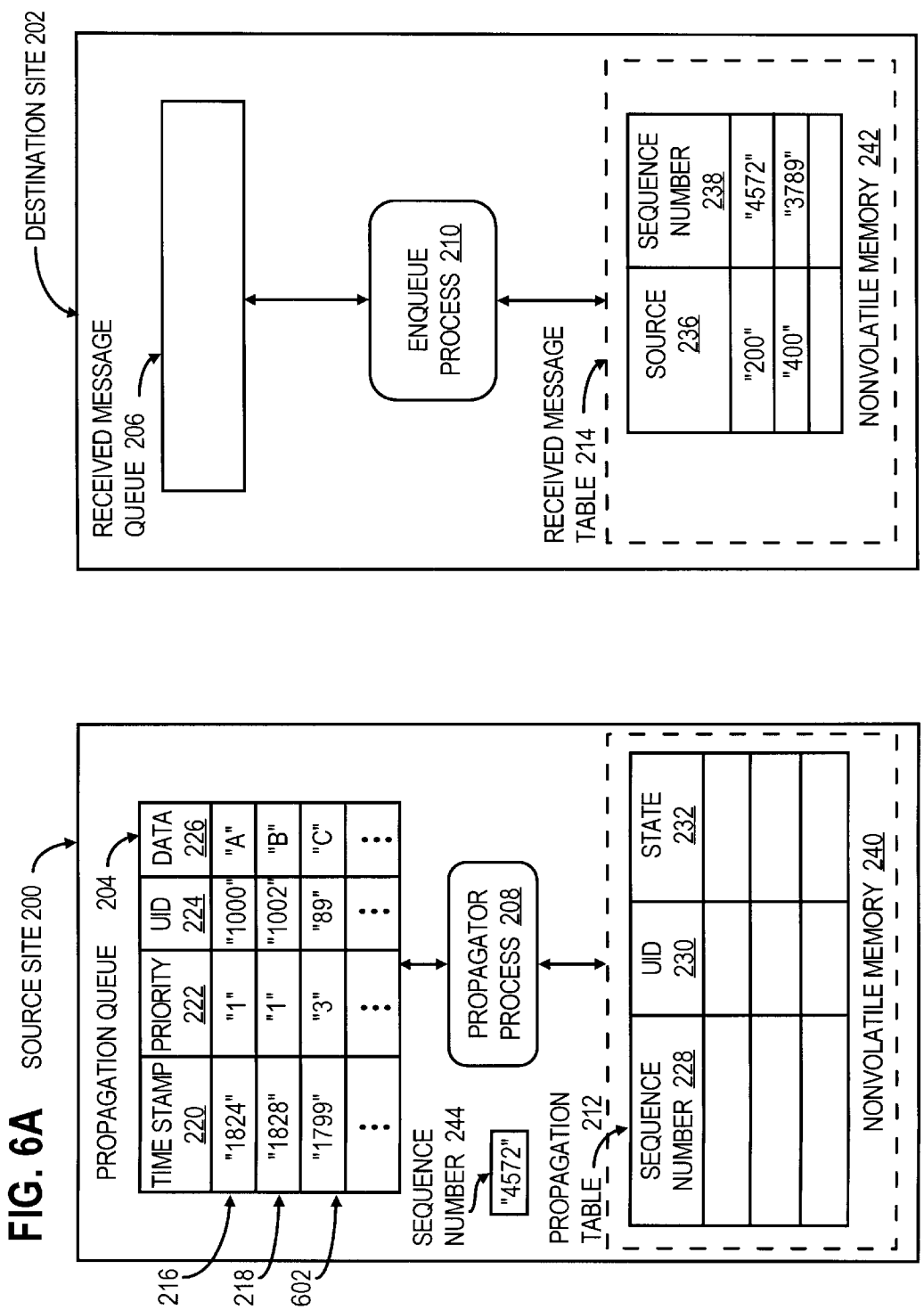
FIG. 6A illustrates a mechanism for propagating a batch of messages from a source site to a destination site.
Figure 6B:
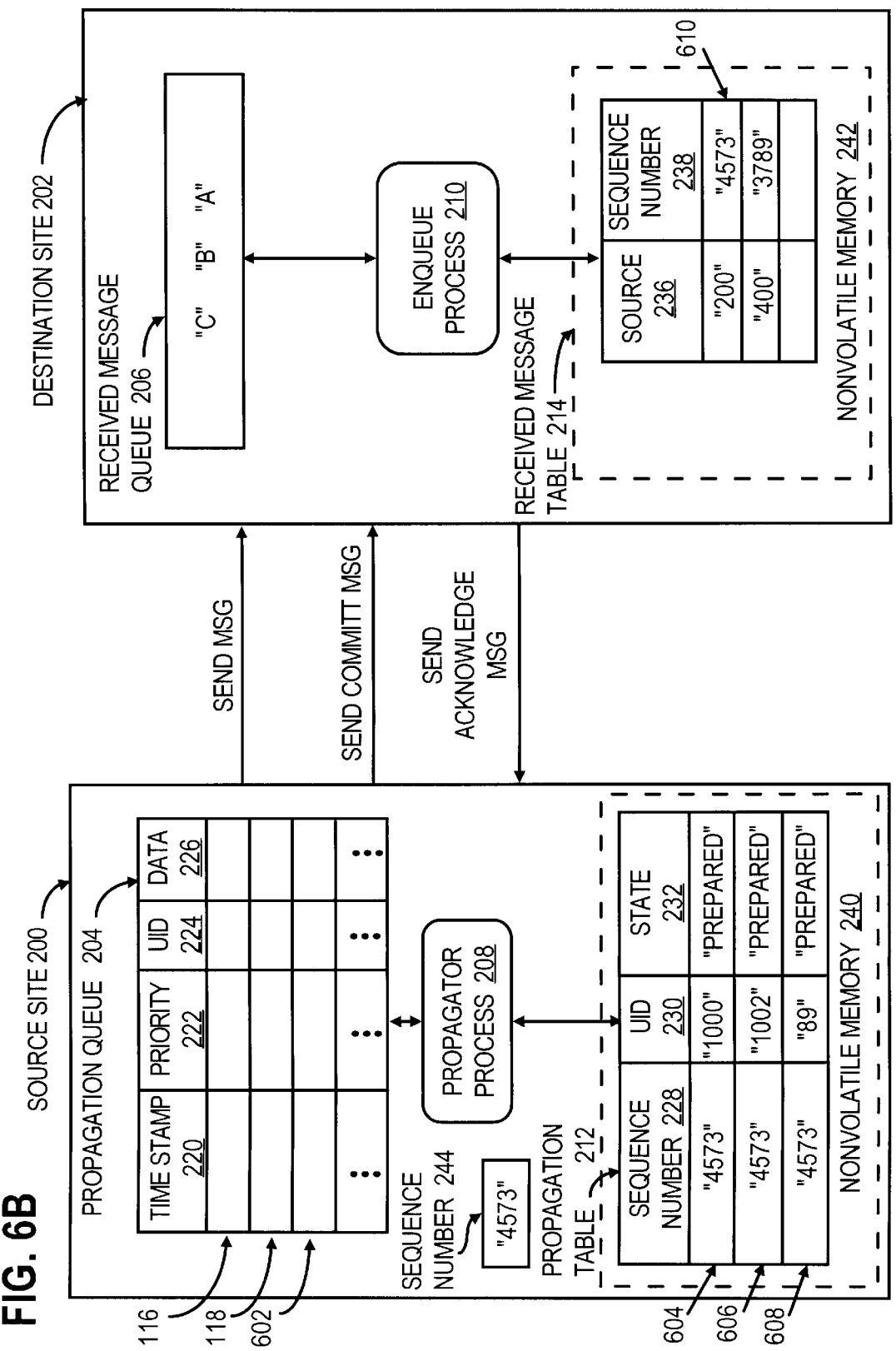
FIG. 6B further illustrates a mechanism for propagating a batch of messages from a source site to a destination site.

FIG. 6A and FIG. 6B illustrate a mechanism for propagating a batch of messages from source site 200 to destination site 202 using a single propagation sequence number. Referring to FIG. 6A, at source site 200, the messages for message entries 216, 218 and 602 are selected for propagation to destination site 202. As depicted in FIG. 6B, propagator process 208 begins a transaction (TX_1) to dequeue the messages for message entries 216, 218 and 602 from propagation queue 204. Propagator process 208 then increments the propagation sequence number 244 and sends the incremented value along with the message to destination site 202. After transmitting the message, propagator process 208 begins a separate transaction (TX_2) to enter the propagation information in propagation table 212 as entries 604, 606 and 608. After entering the propagation information in propagation table 212 the separate transaction (TX_2) commits.

Continuing with transaction (TX_1), propagator process 208 then sends a commit request to destination site 202.

Figure 6C:
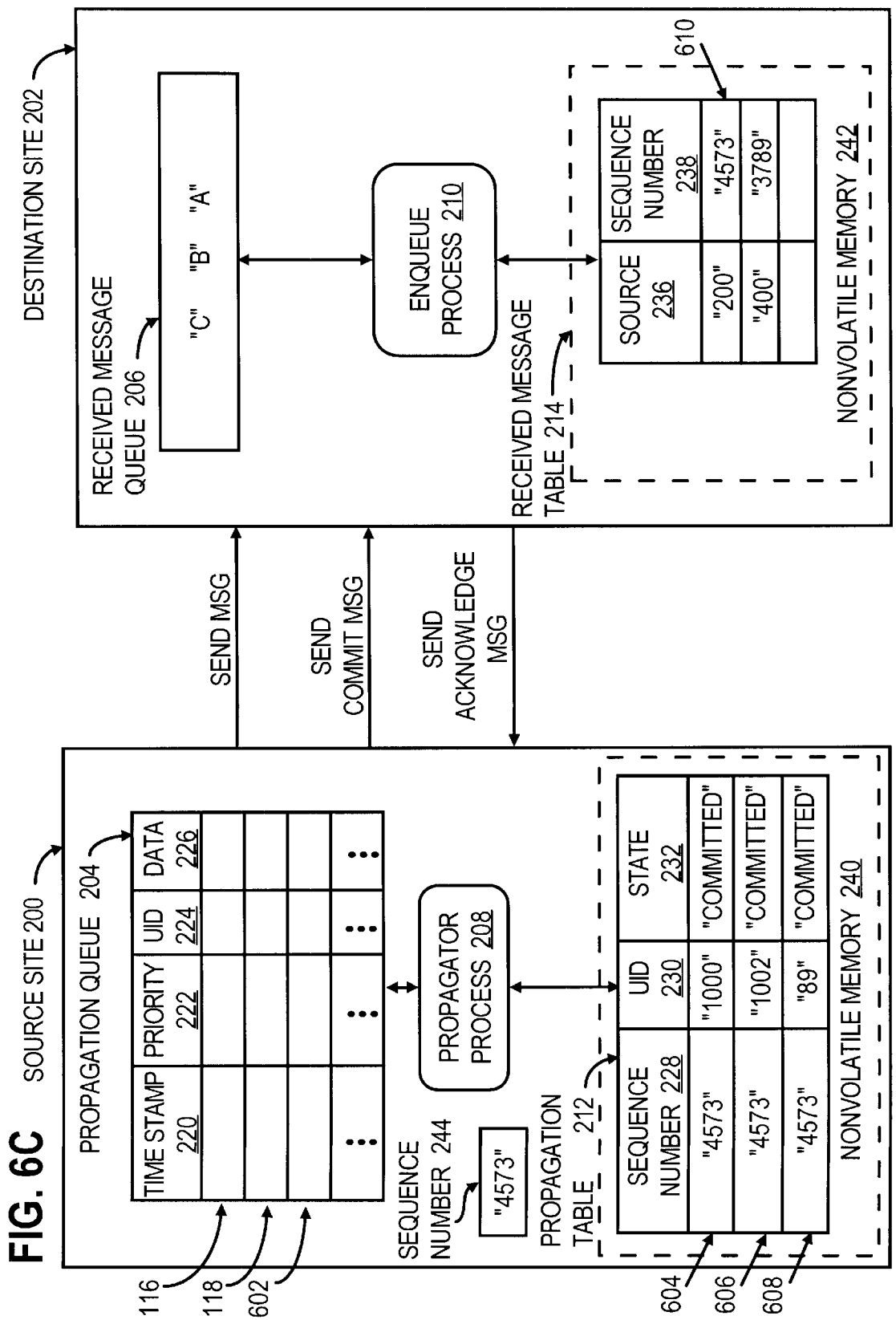
FIG. 6C further illustrates a mechanism for propagating a batch of messages from a source site to a destination site.

Thereafter, propagator process 208 waits for an acknowledge message from destination site 202. As depicted in FIG. 6C, upon receiving an acknowledge message from destination site 202, propagator process 208 updates the state 232 of entries 604, 606 and 608 to reflect that the changes have been committed at destination site 202 and commits transaction (TX_1).

Alternatively, at the destination site 202, upon receiving the batched message, enqueue process 210 begins a transaction (TX_3) that enqueues the batched message (A, B and C) into received message queue 206. Destination site 202 then waits for a commit message to be sent from source site 200. After receiving a commit message, destination site 202 stores the received message information from the batched message as entry 610 in received message table 214. Destination site 202 then commits and returns an acknowledge message to source site 200, and commits the transaction (TX_3).

USING MULTIPLE QUEUES TO PROPAGATE MESSAGES

By assigning a propagation sequence number to each message at the time of propagation, multiple propagation queues may be used to propagate messages to the different destination sites. For example, instead of using a single propagation queue 204 to propagate messages to multiple destination sites, source site 200 may include a separate propagation queue for each destination site. By using multiple propagation queues, message throughput may be increased as a single source site is allowed to propagate messages to multiple destination sites in parallel.

REMOVING ENTRIES IN THE PROPAGATION TABLE

Because propagation information is stored in the propagation table in nonvolatile memory whenever a message is propagated to a destination site, the size of the propagation table can quickly grow unacceptably large. In addition, because the propagation information is typically only used for recovering after a failure, this information can quickly become outdated once it is stored within the propagation table. Thus, to control the size of the propagation, in certain embodiments information that is longer needed is removed from the propagation table on a periodic basis.

However, in most database systems, the removing of information from a table typically causes redo information to be generated. Thus, to reduce amount of redo information that is generated, in one embodiment the propagation process overwrites outdated information when storing propagation information into the propagation table.

In an alternative embodiment, instead of maintaining propagation information in nonvolatile memory at the source site, during recovery the source site retrieves and uses the received message information that the destination site has stored in nonvolatile to identify which messages still need to be propagated to the destination site. This can increase the source site's processing throughput as it may free up certain resources since it is no longer required to maintain propagation information in nonvolatile memory.

Figure 6D:
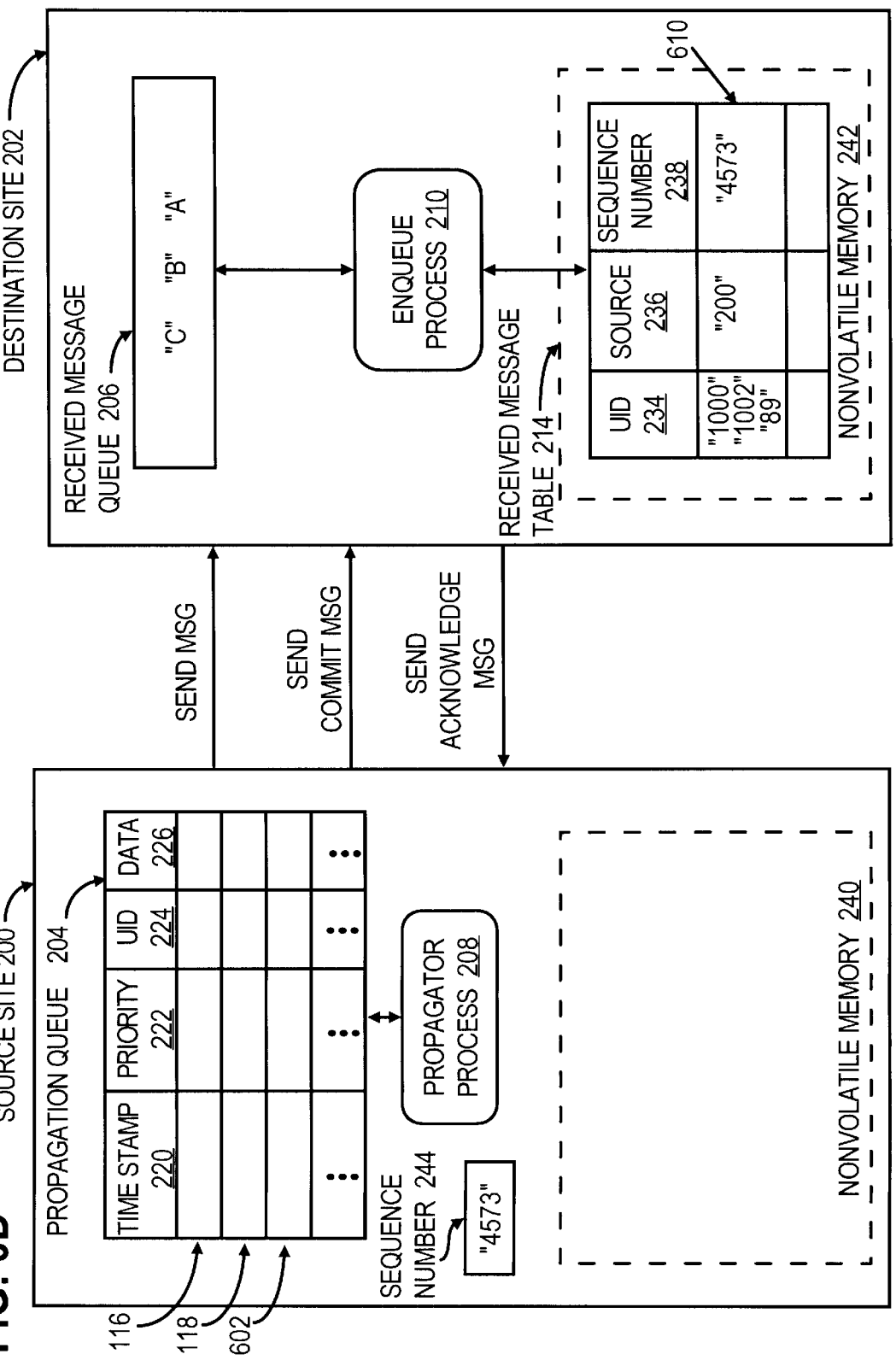
FIG. 6D illustrates a mechanism for propagating a batch of messages from a source site to a destination site in which the destination site stores UID information that is associated with the messages that are received from the source site.
Figure 3:
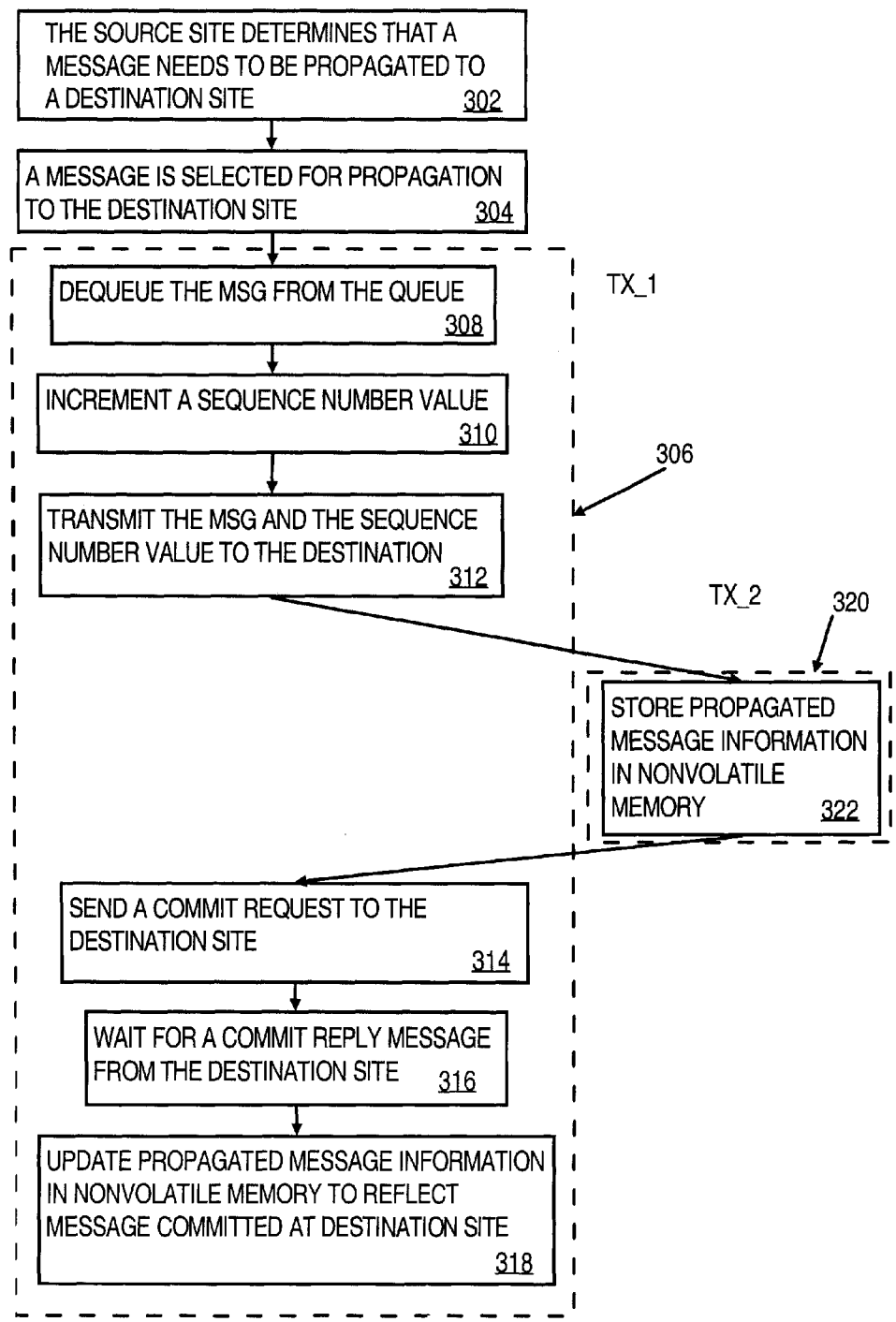

As previously indicated, to properly recover from a failure the source site must be able to identify messages that still need to be propagated to the destination site. Thus, in one embodiment, when propagation information is not maintained at the source site, the destination site may be required to store the UID information of the messages that are received from the source site. For example, as illustrated in FIG. 6D, the message information that is sent from the source site 200 to the destination site 202 may include UID attribute 224 information that is associated with the message information that is being sent. This UID attribute 224 information ("1000", "1002" and "89") may be stored by the destination site 202 in received message table 214 as UID attribute 234. In certain embodiments, during recovery, the source site 200 retrieves the UID information from destination site 202 and uses it in determining which messages in its propagation queue still need to be sent to destination site 202.

In embodiments where the propagation information is not maintained at the source site, destination site is required to retain the message information until a "forget" message is received from the source site indicating the message information may be discarded. The "forget" message may be sent to the destination site using a variety of methods. For example, the "forget " message may be piggybacked on a subsequent batch of messages or sent as a separate message to the destination site. In one embodiment, "forget" messages are piggybacked on next batch of messages that are sent from the source site to the destination site.

HARDWARE OVERVIEW

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for reliable message propagation in a distributed computer system. According to one embodiment of the invention, reliable message propagation in a distributed computer system is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for reliable message propagation in a distributed computer system as described herein.

The received code may be executed by processor 704 as it is received, and/or stored in storage device 710, or other non-volatile storage for later execution. In this manner, computer system 700 may obtain application code in the form of a carrier wave.

EXTENTIONS AND ALTERNATIVES

The foregoing specification describes a propagation mechanism in which the inherent transactional support and capability that is provided in a database system is used to in the propagation of messages from a source site to a destination site. By durably storing a monotonically increasing propagation sequence number for each message that is propagated, the source site upon recovering from a failure, can determine which message still need to be sent to the destination site. Because the source site can determine after failure which messages still need to be sent, upon detecting a failure, the destination site may abort a particular message. Thus, in the case of a failure, the destination site is not required to remain in an in-doubt state until the source site recovers. By removing the in-doubt state, system availability is increased as a source site failure does not stop a destination site from continuing to receive and process messages from other sites.

Also, unlike the use of SCNs, by using a monotonically increasing propagation sequence number to generate an ordering of messages at the time of propagation, messages may be dequeued for propagation even when a transaction is committing.

In addition, by assigning a monotonically increasing propagation sequence number to each of the propagated messages, message priorities may be used to prioritize the sequence in which messages are propagated to a destination site.

In the foregoing specification, the invention has been described with reference to specific embodiments thereof. It will, however, be evident that various modifications and changes may be made thereto without departing from the broader spirit and scope of the invention. Thus, the specification and drawings are, accordingly, to be regarded in an illustrative rather than a restrictive sense. For example, instead of using a monotonically increasing propagation sequence number to order the propagation of messages, in certain embodiments, a monotonically decreasing propagation sequence number is used. What is important is that the propagation sequence numbers provide a logical ordering of when a particular message was transmitted to the destination site relative to other transmitted messages.

In addition, although examples have been provided depicting a single destination site, the propagation mechanism can be easily extended to provide for propagating messages to multiple destination sites. Thus, in certain embodiments of the invention, a message may be propagated from a source site to a plurality of destination sites.

Within this disclosure, including the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for propagating messages from a source site to a destination site, the method comprising the steps of:
   (A) identifying message information that needs to be sent to the destination site;
   (B) after identifying the message information, assigning to the message information a propagation sequence number that identifies when the message information is sent to the destination site relative to other message information sent from the source site to the destination site;
   (C) transmitting a message to the destination site based on said message information, wherein the message includes the propagation sequence number and a source ID, wherein the source ID identifies the source site as transmitting the message to the destination site;

(D) after receiving the message at the destination site, storing in nonvolatile memory at the destination site, the propagation sequence number that was assigned to the message information; and (E) in response to transmitting the message to the destination site, storing propagation information in nonvolatile memory at the source site, wherein propagation information includes the propagation sequence number, propagation state information and a unique ID that uniquely identifies the message information.

2. The method of claim 1, further comprising the steps of:

(F) after storing the propagation information in nonvolatile memory, sending a commit request to the destination site;

(G) waiting for a commit acknowledge message to be received from the destination site;

(H) in response to receiving the commit acknowledge message, updating the propagation state information to indicate that changes that were included in the message have been committed at the destination site.

3. The method of claim 2, wherein:

steps (B), (C), (F), (G) and (H) are performed by the source site using a first transaction; and step (E) is performed by the source site using a second transaction, wherein the first transaction and the second transaction are distinct transactions.

4. The method of claim 3, further includes performing the following steps after receiving the message at the destination site:

(I) enqueuing the message for processing at the destination site;

(J) waiting for a commit request message to be received from the source site; and (K) in response to receiving the commit request message,
(K1) committing the changes associated with the message at the destination site; and
(K2) sending a commit acknowledge message to the source site wherein steps (D), (I), (J) and (K) are performed by the destination site using a third transaction.

5. The method of claim 4, further comprising the step of in response to determining that a communication failure has occurred at the source site, the destination site causing all changes made by the third transaction to be rolled back.

6. The method of claim 3, further comprising the step of in response to detecting a failure at the source site prior to the committing of the first transaction, performing the steps of:

rolling back changes made at the source site by the first transaction;

querying the destination site for the propagation sequence number of the last message that was received and processed from the source site; and identifying message information that still needs to be sent from the source site to the destination site based on the sequence number that is returned by the destination site.

7. The method of claim 1, wherein the step of storing the propagation sequence number in nonvolatile memory further includes the step of storing the source ID in nonvolatile memory at the destination site.

8. The method of claim 1, wherein the step of identifying message information that needs to be sent to the destination site includes the step of identifying at least one message entry, wherein the at least one message entry specifies at least one transaction that needs to be processed at the destination site.

9. The method of claim 8, wherein the step of identifying at least one message entry includes the step of identifying a plurality of message entries, wherein the plurality of message entries specify a plurality of transactions that need to be processed at the destination site.

10. The method of claim 1, wherein:

the message information includes a unique ID that uniquely identifies the message information; and the step of storing the propagation sequence number in nonvolatile memory at the destination site includes the step of storing the unique ID in the nonvolatile memory at the destination site.

11. A method for propagating messages from a source site to a destination site, the method comprising the steps of:

(A) identifying message information that needs to be sent to the destination site by identifying message information that has been inserted into a propagation queue;

(B) after identifying the message information, dequeuing the message information from the propagation queue and assigning to the message information a propagation sequence number that identifies when the message information is sent to the destination site relative to other message information sent from the source site to the destination site;

(C) transmitting a message to the destination site based on said message information, wherein the message includes the propagation sequence number and a source ID, wherein the source ID identifies the source site as transmitting the message to the destination site; and (D) after receiving the message at the destination site, storing in nonvolatile memory at the destination site, the propagation sequence number that was assigned to the message information.

12. A method for propagating messages from a source site to a destination site, the method comprising the steps of:

(A) identifying message information that needs to be sent to the destination site;

(B) after identifying the message information, assigning to the message information a propagation sequence number that identifies when the message information is sent to the destination site relative to other message information sent from the source site to the destination site;

(C) transmitting a message to the destination site based on said message information, wherein the message includes the propagation sequence number and a source ID, wherein the source ID identifies the source site as transmitting the message to the destination site;

(D) after receiving the message at the destination site, storing in nonvolatile memory at the destination site, the propagation sequence number that was assigned to the message information;

(E) enqueuing the message for processing at the destination site;

(F) waiting for a commit request message to be received from the source site; and (G) in response to receiving the commit request message,
(G1) committing the changes associated with the message at the destination site; and
(G2) sending a commit acknowledge message to the source site.

13. A method for propagating messages from a source site to a destination site, the method comprising the steps of:

(A) identifying message information that needs to be sent to the destination site based on a priority value that has been assigned to the message information;

(B) after identifying the message information, assigning to the message information a propagation sequence number that identifies when the message information is sent to the destination site relative to other message information sent from the source site to the destination site;

(C) transmitting a message to the destination site based on said message information, wherein the message includes the propagation sequence number and a source ID, wherein the source ID identifies the source site as transmitting the message to the destination site; and (D) after receiving the message at the destination site, storing in nonvolatile memory at the destination site, the propagation sequence number that was assigned to the message information.

14. A computer-readable medium carrying one or more sequences of one or more instructions which when executed by one or more processors implement a database server that is configured to perform the steps of:

(A) receiving message information from a database client; a destination site;

(B) identifying said message information as information that needs to be sent to a destination site;

(C) after receiving the message information, assigning to the message information a propagation sequence number that identifies when the message information is sent to the destination site relative to other message information sent from the source site to the destination site;

(D) transmitting a message to the destination site based on said message information, wherein the message includes the propagation sequence number and a source ID, wherein the source ID identifies the source site as transmitting the message to the destination site; and (E) after receiving the message at the destination site, storing in nonvolatile memory at the destination site, the propagation sequence number that was assigned to the message information; and (F) in response to transmitting the message to the destination site, storing propagation information in nonvolatile memory at the source site, wherein propagation information includes the propagation sequence number, propagation state information and a unique ID that uniquely identifies the message information.

15. The computer-readable medium of claim 14, wherein the computer-readable medium further comprises instructions for performing the steps of:

(G) after storing the propagation information in nonvolatile memory, sending a commit request to the destination site;

(H) waiting for a commit acknowledge message to be received from the destination site;

(I) in response to receiving the commit acknowledge message, updating the propagation state information to indicate that changes that were included in the message have been committed at the destination site.

16. The computer-readable medium of claim 15, wherein the computer-readable medium further comprises instructions for performing:

step (C), (D), (G), (H) and (I) by the source site using a first transaction; and step (F) by the source site using a second transaction, wherein the first transaction and the second transaction are distinct transactions.

17. The computer-readable medium of claim 16, further comprising a sequence of instructions for performing the following steps after receiving the message at the destination site:

(I) enqueuing the message for processing at the destination site;

(J) waiting for a commit request message to be received from the source site; and (K) in response to receiving the commit request message,
(K1) committing the changes associated with the message at the destination site; and
(K2) sending a commit acknowledge message to the source site wherein steps (E), (I), (J) and (K) are performed by the destination site using a third transaction.

18. The computer-readable medium of claim 17, further comprising a sequence of instructions which when executed, cause the destination site to cause all changes made by the third transaction to be rolled back in response to determining that a communication failure has occurred at the source site.

19. The computer-readable medium of claim 16, further comprising a sequence of instructions for performing the following steps, in response to detecting a failure at the source site prior to the committing of the first transaction:

rolling back changes made at the source site by the first transaction;

querying the destination site for the propagation sequence number of the last message that was received and processed from the source site; and identifying message information that still needs to be sent from the source site to the destination site based on the sequence number that is returned by the destination site.

20. The computer-readable medium of claim 14, wherein the step of storing the propagation sequence number in nonvolatile memory further includes the step of storing the source ID in nonvolatile memory at the destination site.

21. The computer-readable medium of claim 14, wherein the step of identifying message information that needs to be sent to the destination site includes the step of identifying at least one message entry, wherein the at least one message entry specifies at least one transaction that needs to be processed at the destination site.

22. The computer-readable medium of claim 21, wherein the step of identifying at least one message entry includes the step of identifying a plurality of message entries, wherein the plurality of message entries specify a plurality of transactions that need to be processed at the destination site.

23. The computer-readable medium of claim 14, wherein:

the message information includes a unique ID that uniquely identifies the message information; and the computer-readable medium further comprises instructions for storing the unique ID in the nonvolatile memory at the destination site.

24. A computer-readable medium carrying one or more sequences of one or more instructions which when executed by one or more processors implement a database server that is configured to perform the steps of:

(A) receiving message information from a database client;

(B) identifying the message information as information that has been inserted into a propagation queue and needs to be sent to a destination site;

(C) dequeuing the message information from the propagation queue and assigning to the message information a propagation sequence number that identifies when the message information is sent to the destination site relative to other message information sent from the source site to the destination site;

(D) transmitting a message to the destination site based on said message information, wherein the message includes the propagation sequence number and a source ID, wherein the source ID identifies the source site as transmitting the message to the destination site; and (E) after receiving the message at the destination site, storing in nonvolatile memory at the destination site, the propagation sequence number that was assigned to the message information.

25. A computer-readable medium carrying one or more sequences of one or more instructions which when executed by one or more processors implement a database server that is configured to perform the steps of:

(A) receiving message information from a database client;

(B) identifying said message information as information that needs to be sent to a destination site;

(C) after receiving the message information, assigning to the message information a propagation sequence number that identifies when the message information is sent to the destination site relative to other message information sent from the source site to the destination site;

(D) transmitting a message to the destination site based on said message information, wherein the message includes the propagation sequence number and a source ID, wherein the source ID identifies the source site as transmitting the message to the destination site;

(E) after receiving the message at the destination site, storing in nonvolatile memory at the destination site, the propagation sequence number that was assigned to the message information; and (F) enqueuing the message for processing at the destination site;

(G) waiting for a commit request message to be received from the source site; and (H) in response to receiving the commit request message,
 (H1) committing the changes associated with the message at the destination site; and
 (H2) sending a commit acknowledge message to the source site.

26. A computer-readable medium carrying one or more sequences of one or more instructions which when executed by one or more processors implement a database server that is configured to perform the steps of:

(A) receiving message information from a database client;

(B) identifying, based on a priority value that has been assigned to the message information, said message information as information that needs to be sent to a destination site;

(C) after receiving the message information, assigning to the message information a propagation sequence number that identifies when the message information is sent to the destination site relative to other message information sent from the source site to the destination site;

(D) transmitting a message to the destination site based on said message information, wherein the message includes the propagation sequence number and a source ID, wherein the source ID identifies the source site as transmitting the message to the destination site; and (E) after receiving the message at the destination site, storing in nonvolatile memory at the destination site, the propagation sequence number that was assigned to the message information.

27. A computer system for propagating messages from a source site to a destination site, the computer system comprising:

a source site; and a destination site;

wherein the source site and the destination site include instructions which when executed perform the steps of:

(A) identifying message information that needs to be sent to the destination site;

(B) after identifying the message information, assigning to the message information a propagation sequence number that identifies when the message information is sent to the destination site relative to other message information sent from the source site to the destination site;

(C) transmitting a message to the destination site based on said message information, wherein the message includes the propagation sequence number and a source ID, wherein the source ID identifies the source site as transmitting the message to the destination site;

(D) after receiving the message at the destination site, storing in nonvolatile memory at the destination site, the propagation sequence number that was assigned to the message information; and (E) in response to transmitting the message to the destination site, storing propagation information in nonvolatile memory at the source site, wherein propagation information includes the sequence number, propagation state information and an unique ID that uniquely identifies the message information.

28. A method for propagating messages from a source site to a destination site, the method comprising the computer-implemented steps of:

identifying message information that needs to be sent from the source site to the destination site;

assigning, to the message information, a propagation sequence number that identifies when the message information is to be sent from the source site to the destination site relative to other message information sent from the source site to the destination site;

transmitting a message from the source site to the destination site, wherein the message includes the message information, the propagation sequence number and a source ID that identifies the source site as transmitting the message to the destination site, and wherein the propagation sequence number is extracted from the message received at the destination site and stored in nonvolatile memory at the destination site; and storing, in nonvolatile memory at the source site, propagation information that includes the propagation sequence number, propagation state information and a unique ID that uniquely identifies the message information.

29. A computer-readable medium carrying one or more sequences of one or more instructions which, when executed by one or more processors, provide for propagation of messages from a source site to a destination site by causing the one or more processors to perform the steps of:

identifying message information that needs to be sent from the source site to the destination site;

assigning, to the message information, a propagation sequence number that identifies when the message information is to be sent from the source site to the destination site relative to other message information sent from the source site to the destination site;

transmitting a message from the source site to the destination site, wherein the message includes the message information, the propagation sequence number and a source ID that identifies the source site as transmitting the message to the destination site, and wherein the propagation sequence number is extracted from the message received at the destination site and stored in nonvolatile memory at the destination site; and storing, in nonvolatile memory at the source site, propagation information that includes the propagation sequence number, propagation state information and a unique ID that uniquely identifies the message information.

30. A method for propagating messages from a source site to a destination site, the method comprising the computer-implemented steps of:

identifying message information that is stored in a propagation queue and needs to be sent from the source site to the destination site;

dequeuing the message information from the propagation queue;

assigning, to the message information, a propagation sequence number that identifies when the message information is to be sent from the source site to the destination site relative to other message information sent from the source site to the destination site; and transmitting a message from the source site to the destination site, wherein the message includes the message information, the propagation sequence number and a source ID that identifies the source site as transmitting the message to the destination site, and wherein the propagation sequence number is extracted from the message received at the destination site and stored in nonvolatile memory at the destination site.

31. A computer-readable medium carrying one or more sequences of one or more instructions which, when executed by one or more processors, provide for propagation of messages from a source site to a destination site by causing the one or more processors to perform the steps of:

identifying message information that is stored in a propagation queue and needs to be sent from the source site to the destination site;

dequeuing the message information from the propagation queue;

assigning, to the message information, a propagation sequence number that identifies when the message information is to be sent from the source site to the destination site relative to other message information sent from the source site to the destination site; and transmitting a message from the source site to the destination site, wherein the message includes the message information, the propagation sequence number and a source ID that identifies the source site as transmitting the message to the destination site, and wherein the propagation sequence number is extracted from the message received at the destination site and stored in nonvolatile memory at the destination site.

32. A method for propagating messages from a source site to a destination site, the method comprising the computer-implemented steps of:

selecting, based on an assigned priority value, message information to be sent from the source site to the destination site;

assigning, to the message information, a propagation sequence number that identifies when the message information is to be sent from the source site to the destination site relative to other message information sent from the source site to the destination site; and transmitting a message from the source site to the destination site, wherein the message includes the message information, the propagation sequence number and a source ID that identifies the source site as transmitting the message to the destination site, and wherein the propagation sequence number is extracted from the message received at the destination site and stored in nonvolatile memory at the destination site.

33. A computer-readable medium carrying one or more sequences of one or more instructions which, when executed by one or more processors, provide for propagation of messages from a source site to a destination site by causing the one or more processors to perform the steps of:

selecting, based on an assigned priority value, message information to be sent from the source site to the destination site;

assigning, to the message information, a propagation sequence number that identifies when the message information is to be sent from the source site to the destination site relative to other message information sent from the source site to the destination site; and transmitting a message from the source site to the destination site, wherein the message includes the message information, the propagation sequence number and a source ID that identifies the source site as transmitting the message to the destination site, and wherein the propagation sequence number is extracted from the message received at the destination site and stored in nonvolatile memory at the destination site.

* * * * *

UNITED STATES PATENT AND TRADEMARK OFFICE
CERTIFICATE OF CORRECTION

PATENT NO.    : 6,397,352 B1
DATED         : May 28, 2002
INVENTOR(S)   : Chandrasekaran et al.

It is certified that error appears in the above-identified patent and that said Letters Patent is hereby corrected as shown below:

Drawings,
Please replace "Fig. 3" with attached -- Fig. 3 --.

Signed and Sealed this

Tenth Day of September, 2002

Attest:

Attesting Officer

JAMES E. ROGAN
Director of the United States Patent and Trademark Office